US009346502B2

(12) United States Patent
Hutcheson et al.

(10) Patent No.: US 9,346,502 B2
(45) Date of Patent: May 24, 2016

(54) RECONFIGURABLE BALANCING ROBOT AND METHOD FOR MOVING OVER LARGE OBSTACLES

(71) Applicants:Timothy Hutcheson, Pensacola, FL (US); Jerry E Pratt, Pensacola, FL (US)

(72) Inventors: Timothy Hutcheson, Pensacola, FL (US); Jerry E Pratt, Pensacola, FL (US)

(73) Assignee: Florida Institute for Human and Machine Cognition, Inc., Pensacola, FL (US)

( * ) Notice: Subject to any disclaimer, the term of this patent is extended or adjusted under 35 U.S.C. 154(b) by 44 days.

(21) Appl. No.: 14/167,623

(22) Filed: Jan. 29, 2014

(65) Prior Publication Data

US 2015/0210329 A1    Jul. 30, 2015

Related U.S. Application Data

(62) Division of application No. 12/850,842, filed on Aug. 5, 2010, now abandoned, which is a division of application No. 11/591,925, filed on Nov. 2, 2006, now Pat. No. 7,798,264.

(51) Int. Cl.
*B62D 61/12* (2006.01)
*B25J 5/00* (2006.01)
*B25J 9/08* (2006.01)

(52) U.S. Cl.
CPC ................. *B62D 61/12* (2013.01); *B25J 5/007* (2013.01); *B25J 9/08* (2013.01); *Y02T 10/7258* (2013.01); *Y10T 74/20329* (2015.01)

(58) Field of Classification Search
CPC .................................. B62D 61/12; B25J 5/007
USPC ............................. 180/65.1, 65.51, 65.6, 209
See application file for complete search history.

(56) References Cited

U.S. PATENT DOCUMENTS

| 6,112,843 A * | 9/2000 | Wilcox et al. ................. 180/345 |
| 2006/0243499 A1* | 11/2006 | Hosoda ........................... 180/8.5 |
| 2008/0105481 A1* | 5/2008 | Hutcheson et al. ........... 180/209 |

* cited by examiner

*Primary Examiner* — James English
(74) *Attorney, Agent, or Firm* — J. Wiley Horton

(57) ABSTRACT

An apparatus and a method for robotic control that allows an unbalanced pendulum robot to raise its Center of Mass and balance on two motorized wheels. The robot includes a pair of arms that are connected to the upper body of the robot through motorized joints. The method consists of a series of movements employing the arms of the robot to raise the robot to the upright position. The method comprises a control loop in which the motorized drives are included for dynamic balance of the robot and the control of the arm apparatus. The robot is first configured as a low Center of Mass four-wheeled vehicle, then its Center of Mass is raised using a combination of its wheels and the joint located at the attachment point of the arm apparatus and the robot body, between the rear and front wheels; the method then applies accelerations to the rear wheels to dynamically pivot and further raise the Center of Mass up and over the main drive wheels bringing the robot into a balancing pendulum configuration.

7 Claims, 19 Drawing Sheets

RECONFIGURABLE BALANCING ROBOT AND METHOD FOR MOVING OVER LARGE OBSTACLES

CROSS-REFERENCES TO RELATED APPLICATIONS

This application is a divisional application of U.S. application Ser. No. 12/850,842, filed on Aug. 5, 2010, which is a divisional application to 11/591,925, filed on Nov. 2, 2006 and now issued as U.S. Pat. No. 7,798,264.

STATEMENT REGARDING FEDERALLY SPONSORED RESEARCH OR DEVELOPMENT

The development of the invention that is the subject of the present application was partially supported by Department of Defense's Office of Naval Research and Defense Advanced Research Projects Agency.

MICROFICHE APPENDIX

Not Applicable

BACKGROUND OF THE INVENTION

1. Field of the Invention

The present invention pertains to methods for control of the configuration and motion of a robot, without the aid of a person or other external means. More specifically, the present invention is directed to a reconfigurable balancing combat robot and a means for dynamically transitioning from a low Center of Mass configuration to a high Center of Mass balancing configuration without external assistance.

2. Description of the Related Art

Robots have useful applications in many different fields. Robots are particularly useful in combat situations, where they may be deployed into dangerous environments without putting soldiers' lives at risk.

Various robot platforms have been developed for combat and other applications. Conventionally, robots utilize an onboard motor to power wheels, tracks, or other ground-contacting devices to move the robot from one location to another. An operator may remotely control the movement of the robot with a joystick or other input device. Wireless communication devices allow operators to be positioned a substantial distance away from the robot.

The lack of maneuverability provided by current robot platforms has greatly limited the widespread use of robots in combat situations. Unlike human, soldiers, current robot platforms cannot easily maneuver around rocks, trees, and holes. While circumventing these obstacles, robots may be easily targeted and destroyed.

Alternative robot platforms have been developed that overcome some of the drawbacks of a typical wheeled robot. An example of an alternative platform is the Goes-Over-All-Terrain ("GOAT") robot. This platform has four wheels mounted on the ends of articulated arras and legs which allow the robot to travel quickly over flat ground and maneuver over a range of obstacles higher than a wheel diameter. However, the GOAT needs at least three wheels on the ground at any time in order to maintain balance. This limits the height that a sensor or actuator can reach and limits the platform's maneuverability through narrow passages.

Also known in the prior art are human transporter devices that balance on two wheels, allowing for zero turn radius and the ability to ride through narrow passageways. Examples of these human transporter devices are described in U.S. Pat. No. 5,701,965 and U.S. Pat. No. 6,302,230. These transporter devices would make a poor platform for combat robots, however. The balancing vehicles described in these references lack the ability to initially balance themselves when first powered on and would not be able to get back up after falling down. Such a robot would also lack a statically stable four-Wheel mode.

BRIEF SUMMARY OF THE INVENTION

The present invention comprises a robotic vehicle capable of transitioning from a low Center of Mass ("low-COM") configuration to a high Center of Mass ('high-COM") configuration. The robotic vehicle comprises a rear base, a front aim, and a motorized-joint connecting the rear base and the front arm. The robotic vehicle includes a rear drive mechanism attached to the rear base, and a means of locomotion using a rear motorized ground-contacting module. The rear ground-contacting module serves to suspend the mechanism above the rear joint. A forward ground-contacting module is provided attached to the front arm. The forward ground-contacting module may also include a brake. A control module which controls the rear motorized drive is also provided. The control module includes a control loop for dynamically stabilizing the vehicle in the fore-aft plane by operation of the rear motorized drive in connection with the rear ground-contacting module. In all embodiments the ground-contacting modules may be skids, tracks or wheels, without limitation.

In a further embodiment, the forward ground-contacting module is realized as a motorized ground-contacting member.

In a further embodiment, the rear base is realized as a pair of ground-contacting members, laterally disposed with respect to one another.

In a further embodiment, the front base is realized as a pair of ground-contacting members, laterally disposed with respect to one another.

In a further embodiment, the front arms are realized as a pair of ground contacting members, laterally disposed with respect to one another.

The preferred embodiment (shown in FIG. 1) has four motorized wheels for ground-contacting modules. Two motorized wheels are connected to the rear base and two motorized wheels are connected to the front base. The preferred embodiment includes independent front drive and rear drive mechanisms. The front and rear drive mechanisms may be operated in one of several modes including: (1) a combined drive mode using the front and rear drive mechanisms in combination when operating in the low Center of Mass configuration, (2) a rear-only drive mode using only the rear drive mechanism when operating in the high Center of Mass configuration, and (3) a transition mode for transitioning between the combined drive locomotion mode and the rear drive locomotion mode.

Accordingly, the proposed reconfigurable robot has a low center of mass, statically stable mode and a high center of mass, balancing mode. The robot can switch between modes by use of drive wheels and actuated joints. A control system autonomously changes between the modes and also provides balance when in the balancing mode. The robot is capable of transporting various payloads, including camera and weapon systems on a turret. The four-wheel low profile mode allows the robot to move quickly and stably, much like a traditional wheeled vehicle. The two-wheel high profile mode allows the robot to place its camera or weapon system at a high perch, thereby seeing over obstacles. This mode also allows the robot to turn with a zero turning radius. Being able to switch modes allows the robot to have a relatively narrow width. Both the narrow width and the zero turning-radius allow the robot to get through narrow corridors.

According to one illustrative embodiment of the invention, there is a base, two main drive wheels attached to the base, two actuated shoulder joints connected to the base, two arm links attached at the shoulder joints, two wheels attached to the end of the arm links, and a control system that provides a control signal to the shoulder joints and/or the main drive wheels in order to transition between a mode in which all four wheels are in contact with the ground and a mode in which only the two main drive wheels are in contact with the ground.

The transition mode utilizes a transitioning process comprising the steps of:
(a) Applying power to a combination of the rear drive mechanism, the front drive mechanism, and the motorized joint to bring the vehicle into a partially upright position;
(b) Applying power to the rear drive mechanism to accelerate the vehicle backward;
(c) Applying power to the rear drive mechanism to accelerate the vehicle forward and lift the front drive mechanism off the ground; and
(d) Applying power to the rear drive mechanism in order to keep the front drive mechanism off the ground.

REFERENCE NUMERALS IN THE DRAWINGS

Figure 1:
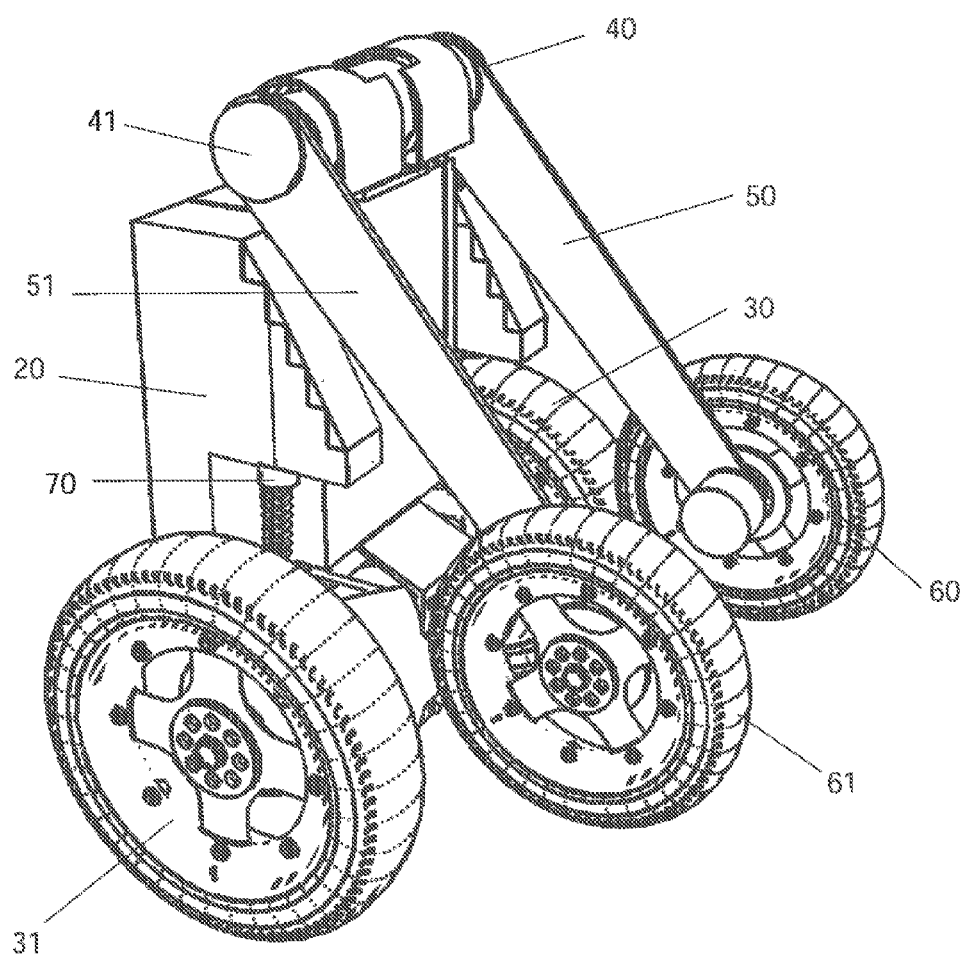
FIG. 1 is a perspective view of one embodiment of the invention shown in a two-wheel high Center of Mass balance configuration.

20 Base
30 main drive wheel
31 main drive wheel
32 motor amplifier
34 electric motor
36 gear reduction
40 powered shoulder joint
41 powered shoulder joint
50 arm link
51 arm link
60 wheel
61 wheel
70 suspension system
80 track system
90 turret
92 embedded computer system
94 inertial measurement unit
100 weapon system
110 camera system
200 rear ground contacting member
205 rear drive wheel
206 rear track
210 rear base
220 powered joint
230 front base
240 front ground contacting member
245 front drive wheel
246 front track
700 obstacle
1600 embedded processor
1601 embedded processor batteries
1602 pitch, roll, and yaw sensors
1603 motor drive batteries
1610 left arm wheel rotation sensor
1611 left arm wheel motor
1612 left arm wheel amplifier
1615 right arm wheel, rotation sensor
1616 right arm wheel amplifier
1617 right arm wheel motor
1620 GPS device 1630 compass
1640 wireless high speed data link
1650 left shoulder rotation sensor
1651 left shoulder motor
1652 left shoulder amplifier
1655 right shoulder rotation sensor
1656 right shoulder amplifier
1657 right shoulder motor
1660 left rear wheel rotation sensor
1661 left rear wheel motor
1662 left rear wheel amplifier
1665 right rear wheel rotation sensor
1666 right rear wheel amplifier
1667 right rear wheel motor
7000 Stand-Up command
7100 watchdog timer
7110 step
7120 step
7130 step
7140 comparator
7150 comparator
7160 fault code
7200 watchdog timer
7210 step
7220 comparator
7230 comparator
7240 fault code
7300 watchdog timer
7310 step
7320 comparator
7330 comparator
7340 fault code
7400 balancing mode
8000 Lie-Down command
8100 watchdog timer
8110 step
8120 comparator
8130 comparator
8140 fault code
8200 watchdog timer
8210 step
8220 comparator
8230 comparator
8240 fault code
8300 watchdog tinier
8310 step
8320 step
8330 comparator
8340 comparator
8350 fault code
8400 four-wheel ground contact stasis
9020 solenoid-activated gear
9030 gun mount carriage
9040 gears

DETAILED DESCRIPTION OF THE INVENTION

The invention may be implemented in a wide range of embodiments. A characteristic of many of these embodiments is the ability to transition from a low Center of Mass configuration to a high Center of Mass balancing configuration. In the low Center of Mass configuration, a set of rear ground contacting members and a set of front ground contacting members provide a stable base of support in the high Center of Mass configuration, only one set of ground contacting members (typically the rear ground contacting members) provide ground support while the other set (typically the front ground contacting members) are raised off the ground. An actuated joint located between the rear ground contacting members and the front ground contacting members is used to raise the Center of Mass when transitioning between the low Center of Mass configuration and the high Center of Mass configuration, and also to hold up the front ground contacting members when in the high Center of Mass configuration. A transitioning process is provided, for transition to the high Center of Mass configuration.

Figure 2:
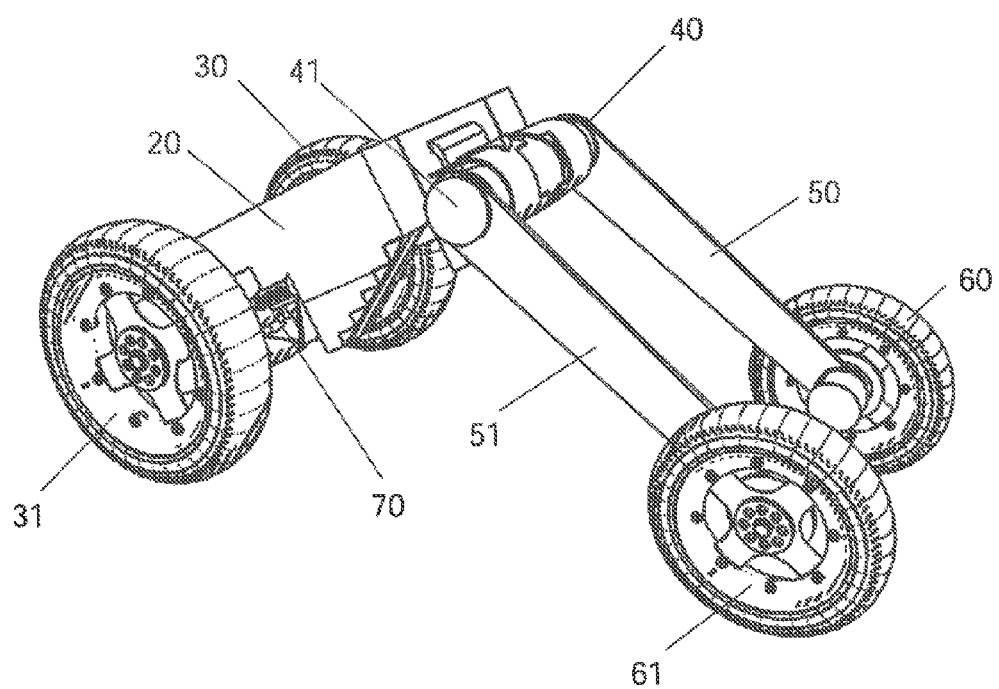
FIG. 2 is another perspective view of the embodiment of FIG. 1, shown in a four-wheel low Center of Mass configuration.

FIGS. 1 and 2 show perspective views of one embodiment of the invention. Two main drive wheels 30, 31 are connected to base 20. Main drive wheels 30, 31 can each he powered by various means, including an electric motor with a gear reduction, a hydraulic motor, or an internal combustion engine and transmission. Suspension system 70 may also provide support between base 20 and main drive wheels 30, 31. Two powered shoulder joints 40, 41 are connected to the base. The shoulder joints also may be powered by various means, including electric motors with gear reductions, hydraulic motors, or internal combustion engines. Two arm links 50, 51 are connected to the shoulder joints. Two arm wheels 60, 61 are connected at the end of the arm links. These wheels may be either passive or powered and may or may not have a steering mechanism.

FIG. 1 shows the invention in an upright two-wheeled high Center of Mass balance configuration in which a control system provides a command to main drive wheels 30, 31 in order to balance the robot on the two main drive wheels. The reader will note that when the robot is in the balance configuration, the front wheels are off the ground. Accordingly, the control system sends control signals to the motors that power the rear wheels. The control signal sent by the control system is related to a measurement of the robot's Center of Mass with respect to the contact point of the wheels that are contacting the ground. Such a measurement could come from a gyroscope mounted in the base, an inertial measurement unit mounted in the base, a camera system mounted to the base or arms, or other means.

FIG. 2 shows the invention in a four-wheel low Center of Mass configuration. In this configuration powered shoulder joints 40, 41 can be locked in order to maintain the configuration, or they can be used in conjunction with main drive wheels 30, 31 and arm wheels 60, 61 in order to raise or lower the Center of Mass. The powered shoulder joints accomplish this by supplying a torque between the base and each of the arms.

Figure 3:
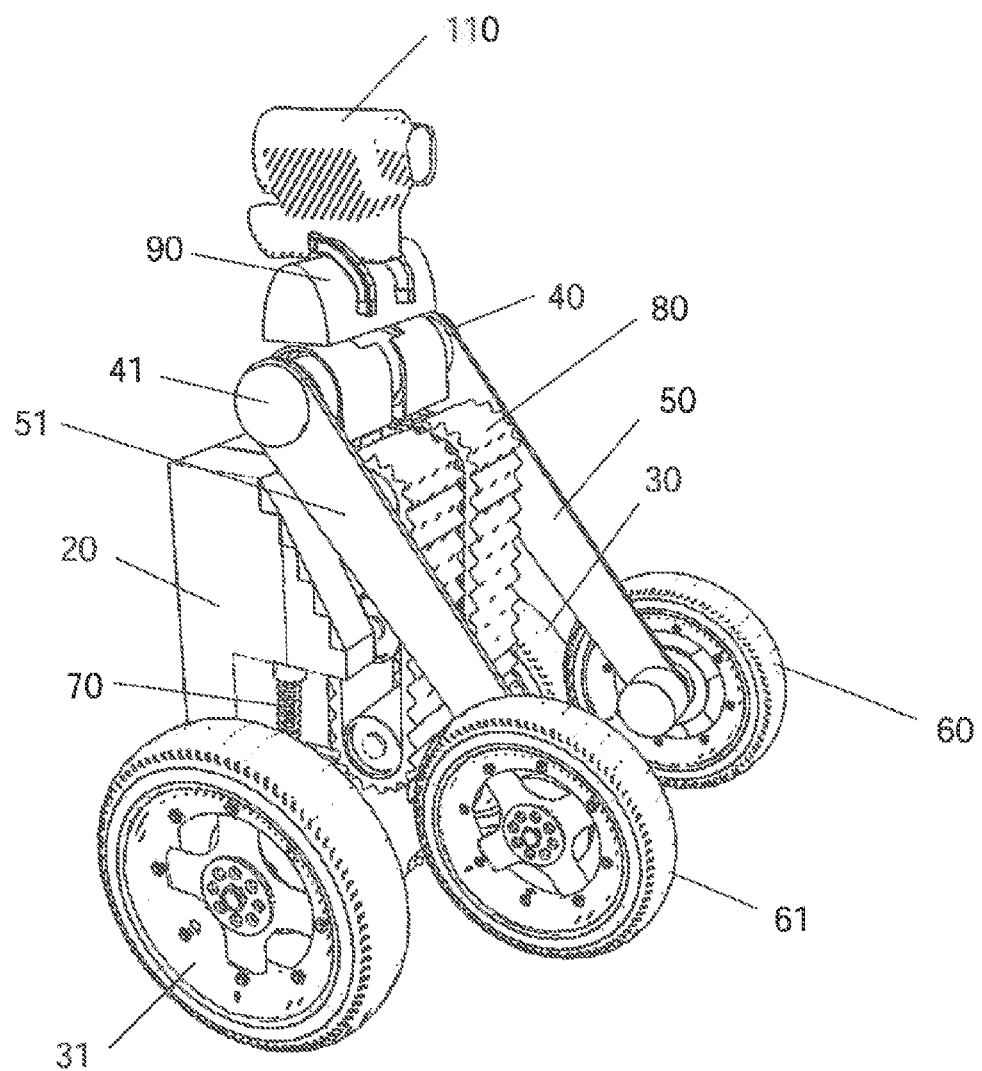
FIG. 3 is a perspective view of the embodiment of FIG. 1 with the addition of a camera payload mounted on an actuated turret.

FIG. 3 shows a perspective view of the embodiment of FIG. 1 and FIG. 2 with the addition of a camera system and trade system. In this embodiment, track system 80 is attached to base 20. Turret 90 is also attached to base 20, and camera system 110 is attached to turret 90. Camera system 100 may be remotely controlled and oriented through the control of turret 90. Track system 80 can be used in order to get over rough terrain. One or more drive wheels may be powered to drive the belt or "track." Track system 80 may operate similarly to caterpillar-type or Kegresse-type track systems. That is the track may comprise interlocking metal segments or a flexible material.

Figure 4:
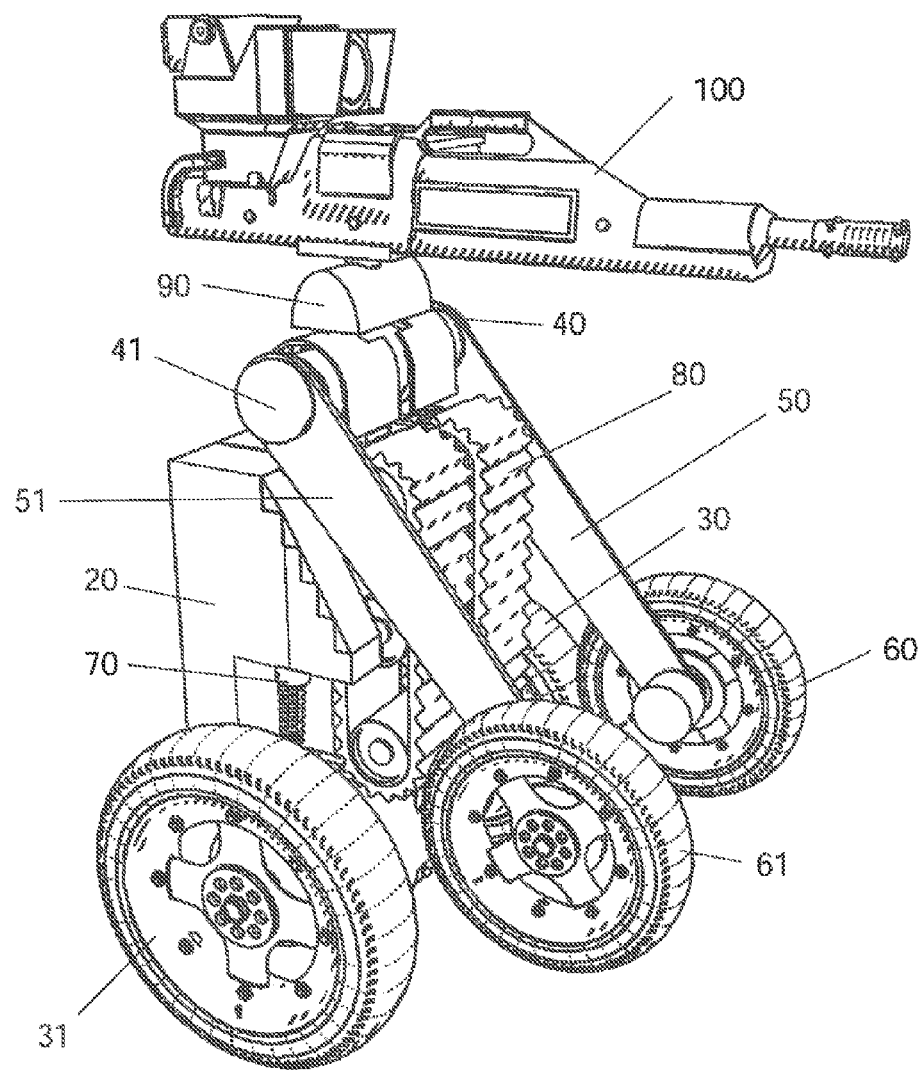
FIG. 4 is a perspective view of the embodiment of FIG. 1, with the addition of a weapon payload mounted on an actuated turret.

FIG. 4 shows a perspective view of the embodiment of FIG. 1 and FIG. 2 with the addition of a weapon system. In this embodiment, track system 80 is attached to base 20. Turret 90 is also attached to the base 20, and weapon system 100 is attached to turret 90. In this embodiment the weapon system 100 may be remotely controlled and oriented through the control of turret 90.

Figure 5:
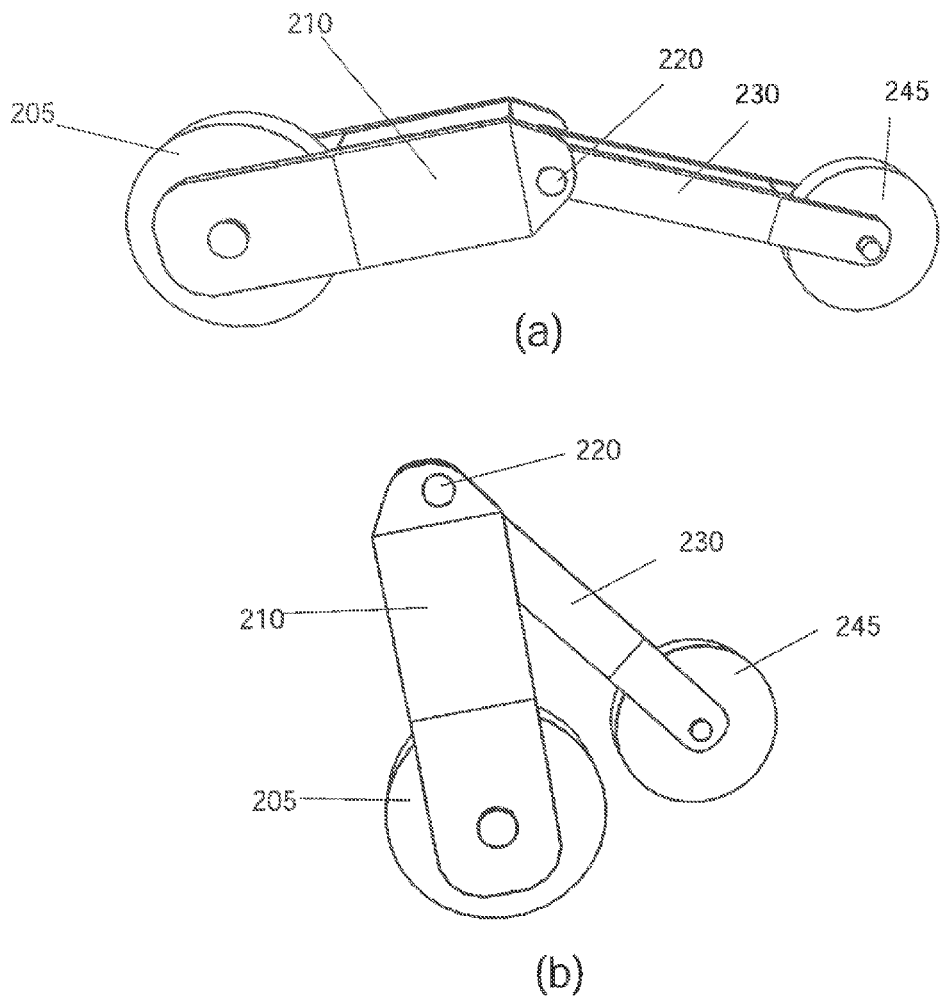
FIG. 5 is a perspective view of another embodiment of the invention shown in a to Center of Mass Configuration (a) and a high Center of Mass Configuration (b).

FIGS. 5(a) and 5(b) show a simplified embodiment of the invention in a low Center of Mass configuration and a high Center of Mass configuration, respectively. Rear drive wheel 205 is connected to rear base 210. Rear drive wheel 205 can be powered by various means, including electric or hydraulic motors. Powered joint 220 is connected to rear base 210. Powered joint 220 may also be powered by various means, including electric or hydraulic motors. Front base 230 is connected to powered joint 220. Front drive wheel 245 is connected to front, base 230. The front wheel may be either passive or powered and may or may not have a steering mechanism.

Figure 6:
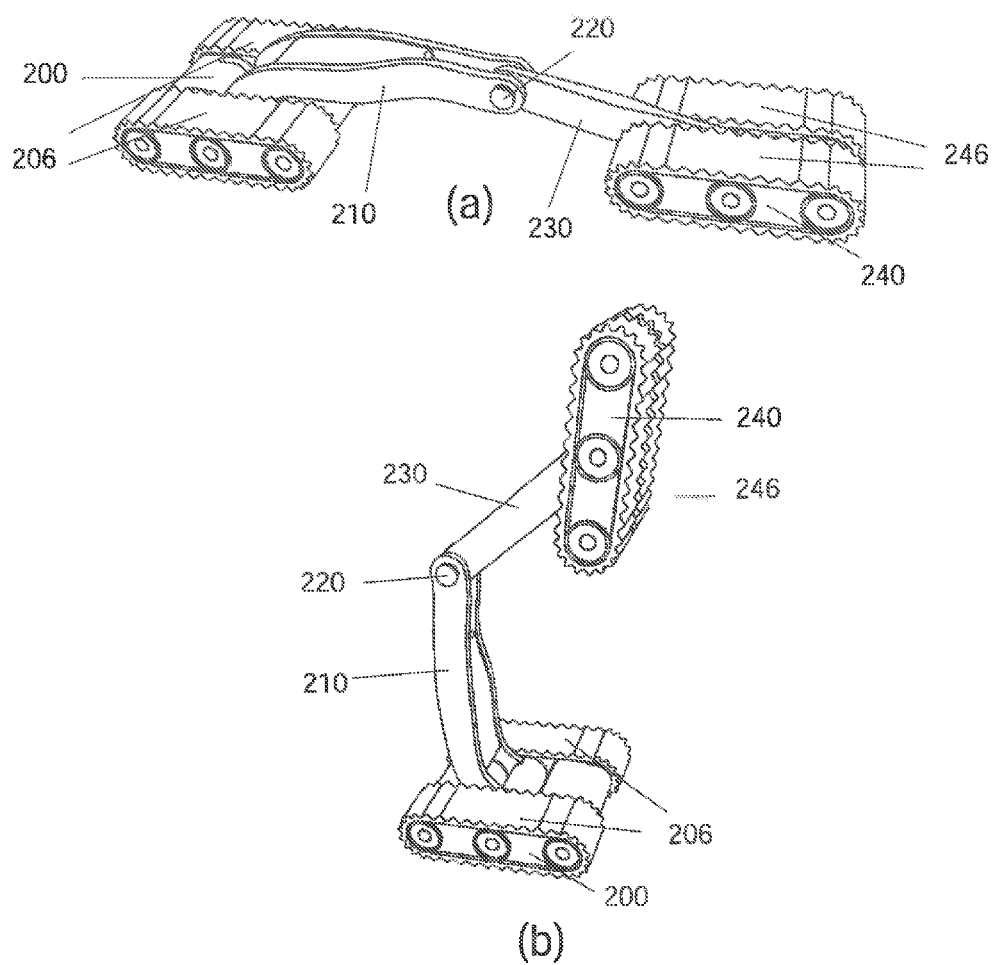
FIG. 6 is a perspective view of another embodiment of the invention shown in a low Center of Mass Configuration (a) and a high Center of Mass Configuration (b).

FIGS. 6(a) and 6(b) show another embodiment of the invention in a low Center of Mass configuration and a high Center of Mass configuration, respectively. Rear ground contacting member 200 includes one or more rear tracks 206 connected to rear base 210. Rear tracks 206 can be powered by various means, including electric or hydraulic motors. Powered joint 220 is connected to rear base 210. Powered joint 220 may also be powered by various means, including electric or hydraulic motors. Front base 230 is connected to powered joint 220. Front ground contacting member 240 includes one or more front tracks 246 connected to front base 230. Front tracks 246 can be powered by various means, including electric or hydraulic motors.

Figure 7:
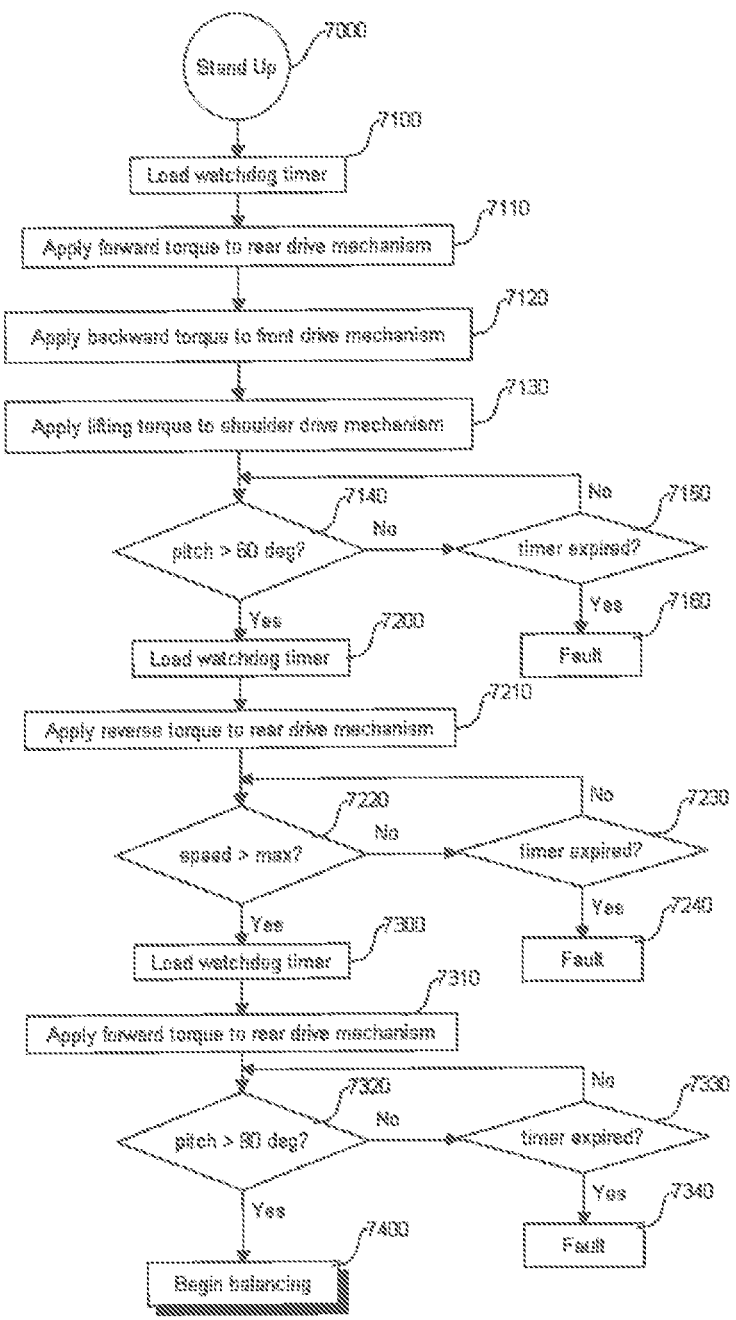
FIG. 7 shows a flowchart detailing an algorithm for transitioning the device from a low Center of Mass configuration to a high Center of Mass balance configuration.

FIG. 7 shows a flowchart detailing a process for transitioning from a low Center of Mass configuration to a high Center of Mass balance configuration. When Stand-Up command 7000 is received, watchdog timer 7100 is loaded with the expected time required for the operation. Torque is then applied in the forward direction, as indicated by step 7110, to the drive(s) of the rear ground-contacting member concurrently with the application of torque in the reverse direction to the drive(s) of the front ground-contacting member as indicated by step 7120. Lifting torque is also applied to the drive(s) of the arm attachment joint concurrently with the application of torque to the ground-contacting members as indicated by step 7130.

Comparator 7140 determines whether the robot has attained the threshold angle (60 degrees in the present example). Comparator 7140 makes this determination by comparing input data provided by a sensor to the predefined threshold angle. If the robot has not attained the threshold angle comparator 7140 looks to comparator 7150 to determine if the timer of watchdog timer 7190 has expired. If watchdog timer 7109 has expired, fault code 7160 is generated. The process may then be repeated.

When the pitch of the robot has ascended to an angle greater than a desired maximum, placing the robot in an A-frame pose, a reverse torque is applied to the rear ground-contacting members as indicated by step 7210. This reverse torque accelerates the robot backward until a sufficient speed in the reverse direction is reached. Watchdog timer 7200 is loaded with the time expected to attain sufficient speed concurrently with the application of reverse torque. Comparator 7220 determines Whether the speed of the robot has attained the threshold speed required. If the threshold speed has not been attained comparator 7220 looks to comparator 7230 to determine whether watchdog timer 7200 has expired, if watchdog timer 7200 has expired, fault code 7240 is generated. The process may then be repeated from Stand-Up command 7000.

If a sufficient speed is attained, the torque on the rear drives is changed to accelerate the robot in the forward direction as indicated by step 7310, dynamically lifting the aspect of the robot further to the vertical. Watchdog timer 7310 is also loaded concurrently with the application of the forward torque. Watchdog tinier 7310 is loaded with the expected time required to attain a vertical pose once a sufficient forward speed has been attained, Comparator 7320 is used to determine whether the vehicle has attained a pitch greater than 90 degrees. If a vertical pose has not been attained, comparator 7320 looks to comparator 7330 to determine if watchdog tinier 7310 has expired. If watchdog timer 7310 has expired, fault code 7340 is generated. The process may then be repeated from Stand-Up command 7000.

When a vertical pose is attained, the control switches to balancing mode 7400 and the robot is brought into balancing stasis.

Figure 8:
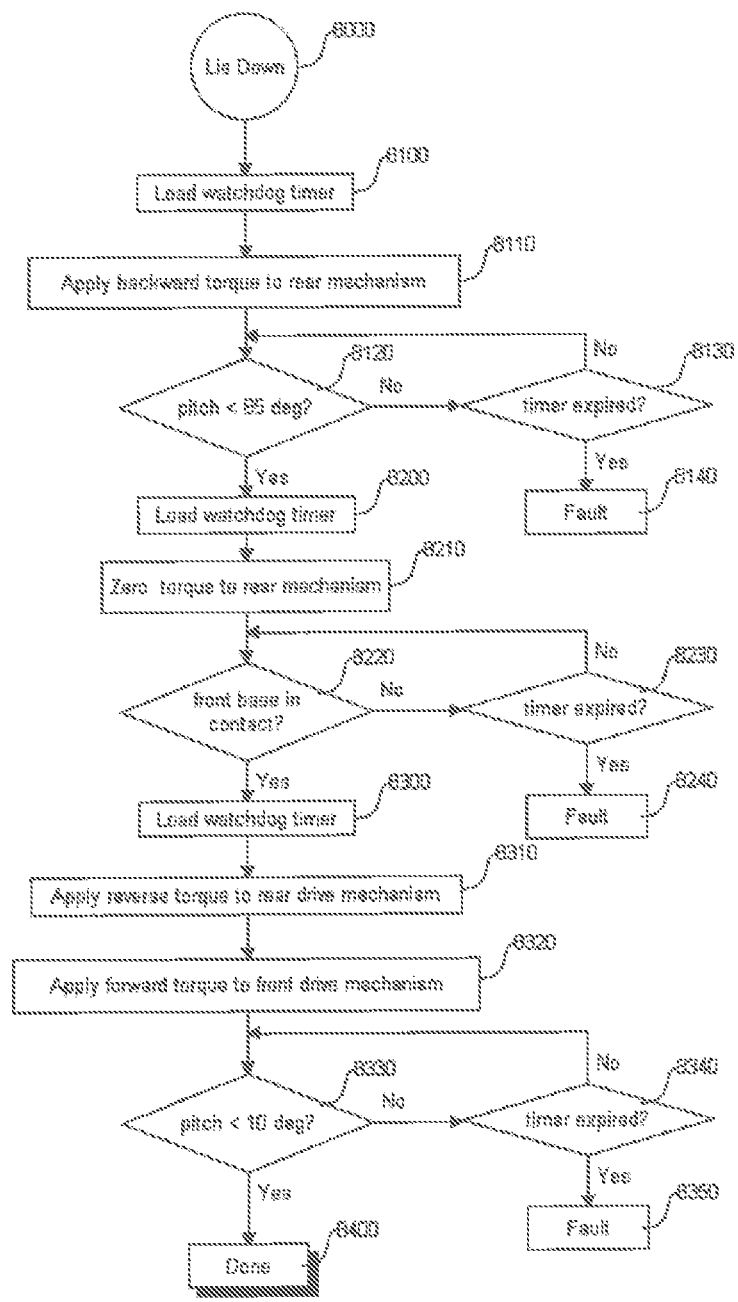
FIG. 8 shows a flowchart detailing an algorithm for transitioning the device from a high Center of Mass balance configuration to a low Center of Mass configuration.

FIG. 8 shows a flowchart detailing a process for transitioning from a high. Center of Mass balance configuration to a low Center of Mass configuration. When Lie-Down command 8000 is received, watchdog timer 8100 is loaded with the expected time required for the operation. Backward torque is concurrently applied to the motorized drives of the rear ground-contacting member, as indicated by step 8110. This causes the robot to begin to tilt forward. Comparator 8120 determines whether the vehicle has attained a threshold pitch (less than 85 degrees measured from the horizontal in the present example). If the vehicle has not attained the threshold pitch, comparator 8120 look to comparator 8130 to determine whether watchdog timer 8100 has expired. If watchdog timer 8100 has expired, fault code 8140 is generated. The process may then be repeated.

When sufficient reduction in pitch is attained, the torque is removed from the rear ground-contacting member and the robot is allowed to settle into the A-Frame position as indicated by step 8210. Watchdog timer 8200 is concurrently loaded with the time expected to complete the operation. Comparator 8220 determines whether the front base of the vehicle has made contact with the ground. If it has not, comparator 8220 looks to comparator 8230 to determine whether watchdog timer 8200 has expired. If watchdog timer 8200 has expired, fault code 8240 is generated. The process may then be repeated from Lie-Down command 8000.

When contact of the front ground-contacting member and the ground is confirmed by comparator 8220, a reverse torque is applied to the motorized drives of the rear ground contacting member as indicated by step 8310. Forward torque is concurrently applied to the motorized drives of the forward wound-contacting member as indicated by 8320 until the aspect of the robot is brought down to a desired threshold angle. Watchdog timer 8300 is loaded with the expected time to reach the threshold angle. Comparator 8330 determines whether the vehicle has attained the threshold angle (less than 10 degrees in the present example). If the threshold angle has not been attained, comparator 8330 looks to comparator 8340 to determine whether watchdog timer 8300 has expired. If it has, fault code 8350 is generated. The process may then be repeated from Lie-Down command 8000. Once the vehicle attains the threshold angle, the torques are removed, leaving the robot in four-wheel ground contact stasis 8400.

Figure 9:
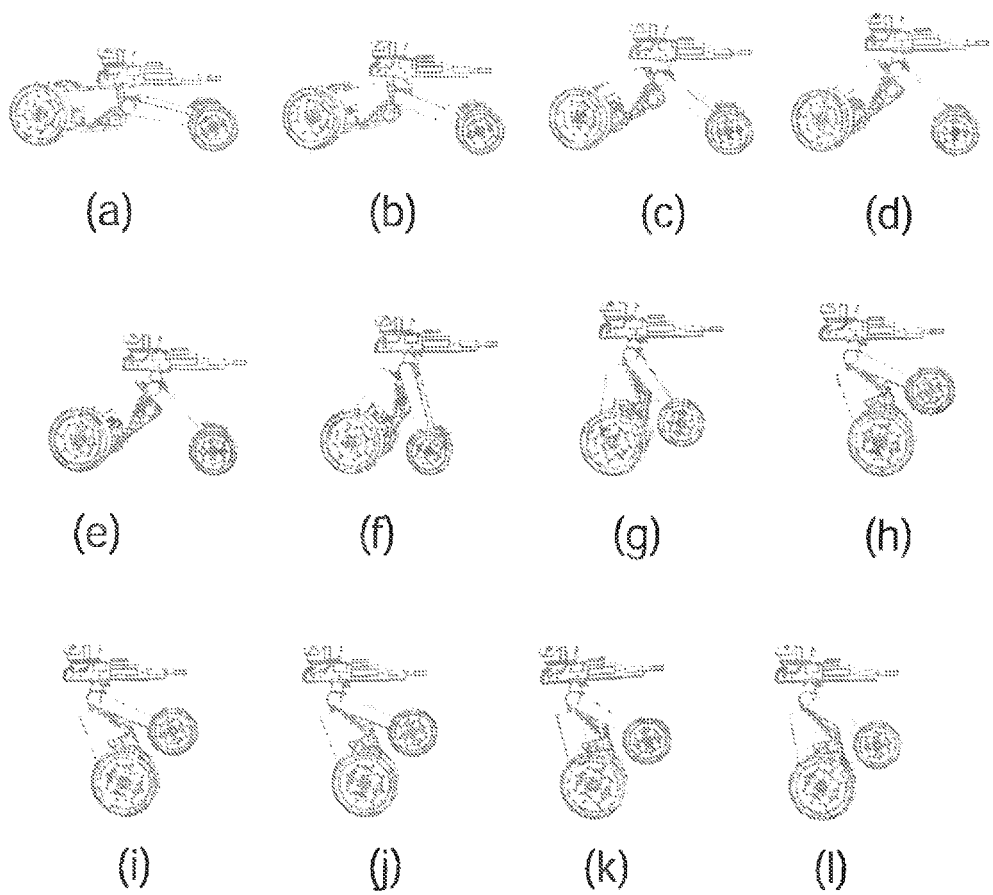
FIG. 9 is a time-lapsed image sequence of the embodiment of FIG. 4 transitioning from a four-wheel low Center of Mass configuration to a four-wheeled A-frame configuration to a two wheeled high Center of Mass balance configuration.

FIG. 9 is a time-lapsed image sequence of the embodiment shown in FIG. 4 transitioning from a four-wheel to Center of Mass configuration (a) to a four-wheeled A-frame configuration (d) to a two-wheeled high Center of Mass balance configuration (l). In this image sequence, a combination of main drive wheels 30, 31, arm wheels 60, 61, and shoulder joints 40, 41 are used to raise the Center of Mass.

Figure 10:
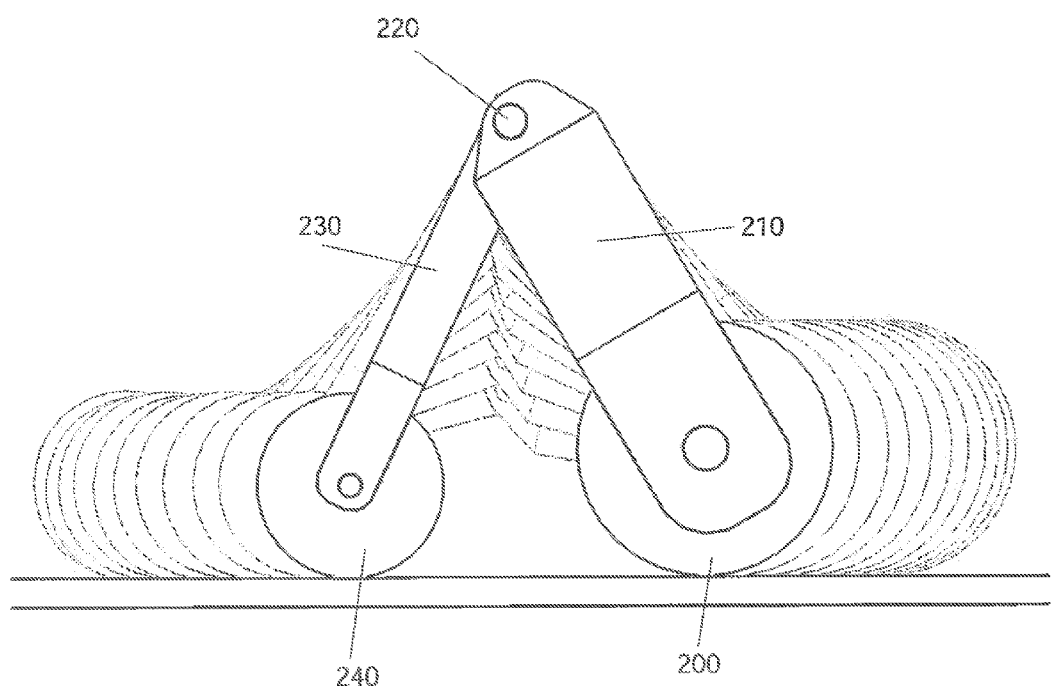
FIG. 10 shows a time-lapsed composite image of one embodiment of the invention transitioning from a four-wheel low Center of Mass configuration to a four-wheeled A-frame configuration.

FIG. 10 shows a time-lapsed composite image of a simplified embodiment of the invention transitioning from low Center of Mass configuration to an A-frame configuration. Rear ground contacting member 200 is attached to rear base 210. The rear base is connected to powered joint 220. The powered joint is connected to front base 230. The front base is connected to front ground contacting member 240. When in both the low Center of Mass configuration and in the A-frame configuration, both the rear ground contacting member and the front ground contacting member are in contact with the ground. During the transition from the low Center of Mass configuration to the A-frame configuration, power is applied to a combination of the rear ground contacting member 200, powered joint 220, and front ground contacting member 240. One such method of applying power to a specific embodiment of the invention is described subsequently.

Figure 11:
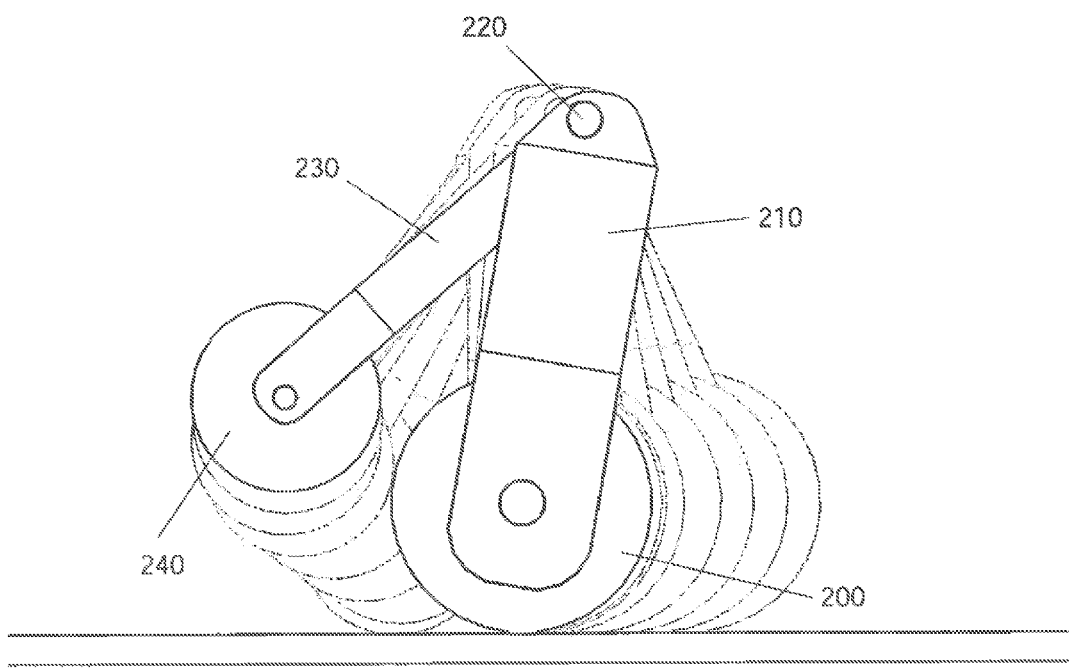
FIG. 11 shows a time-lapsed composite image of one embodiment of the invention transitioning from a four-wheeled A-frame configuration to a two-wheeled high Center of Mass balance configuration.
Figure 12:
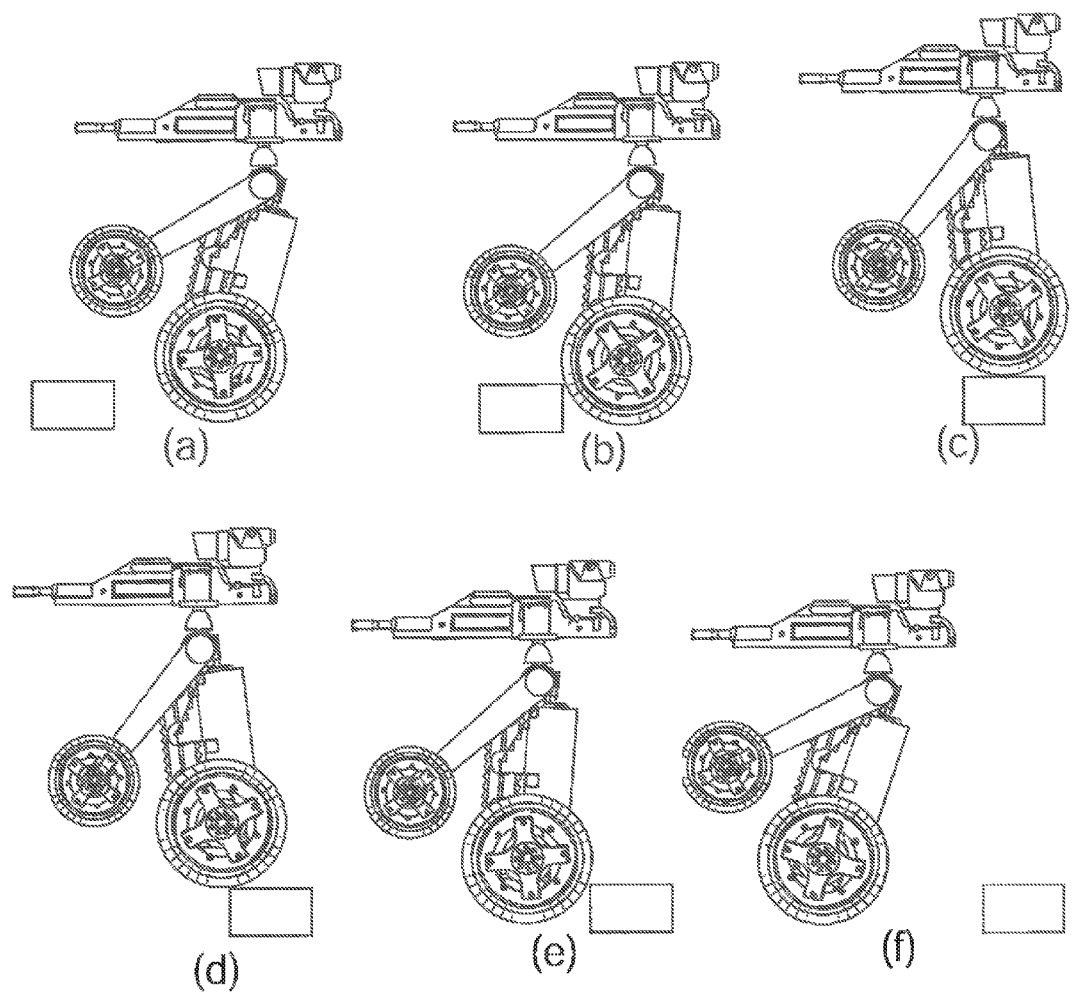
FIG. 12 shows a time-lapsed image sequence of the embodiment of FIG. 4 driving over a relatively small obstacle.

FIG. 11 shows a time-lapsed composite image of one embodiment of the invention transitioning from an A-frame configuration to a high Center of Mass balance configuration. Rear ground contacting member 200 is attached to rear base 210. The rear base is connected to powered joint 220. The powered joint is connected to front base 230. The front base is connected to front ground contacting member 240. When in the A-frame configuration, both the rear ground contacting member and the front ground contacting member are in contact with the ground. When in the high Center of Mass balance configuration, the rear ground contacting member is in contact with the ground, while the front ground contacting member is not in contact with the wound. During the transition from the A-frame configuration to the high Center of Mass balance configuration, power is applied to rear wound contacting member 200 to raise the Center of Mass up and over rear wound contacting member 200. One such method of applying power to a specific embodiment of the invention is described subsequently, FIG. 12 shows a time-lapsed image sequence of the embodiment of the invention shown in FIG. 4 riding over a relatively small obstacle in this image sequence, the robot slows down on the approach of the obstacle (a); drives toward the obstacle, initiating contact between the obstacle and the rear drive wheel (b); applies a torque to the rear drive wheel to lift its center of mass onto the obstacle while balancing (c); drives over the obstacle (d); drives off the obstacle (e); and drives away from the obstacle (f). Throughout this motion, the robot remains balanced using a balance control method Which is described in greater detail subsequently.

Figure 13:
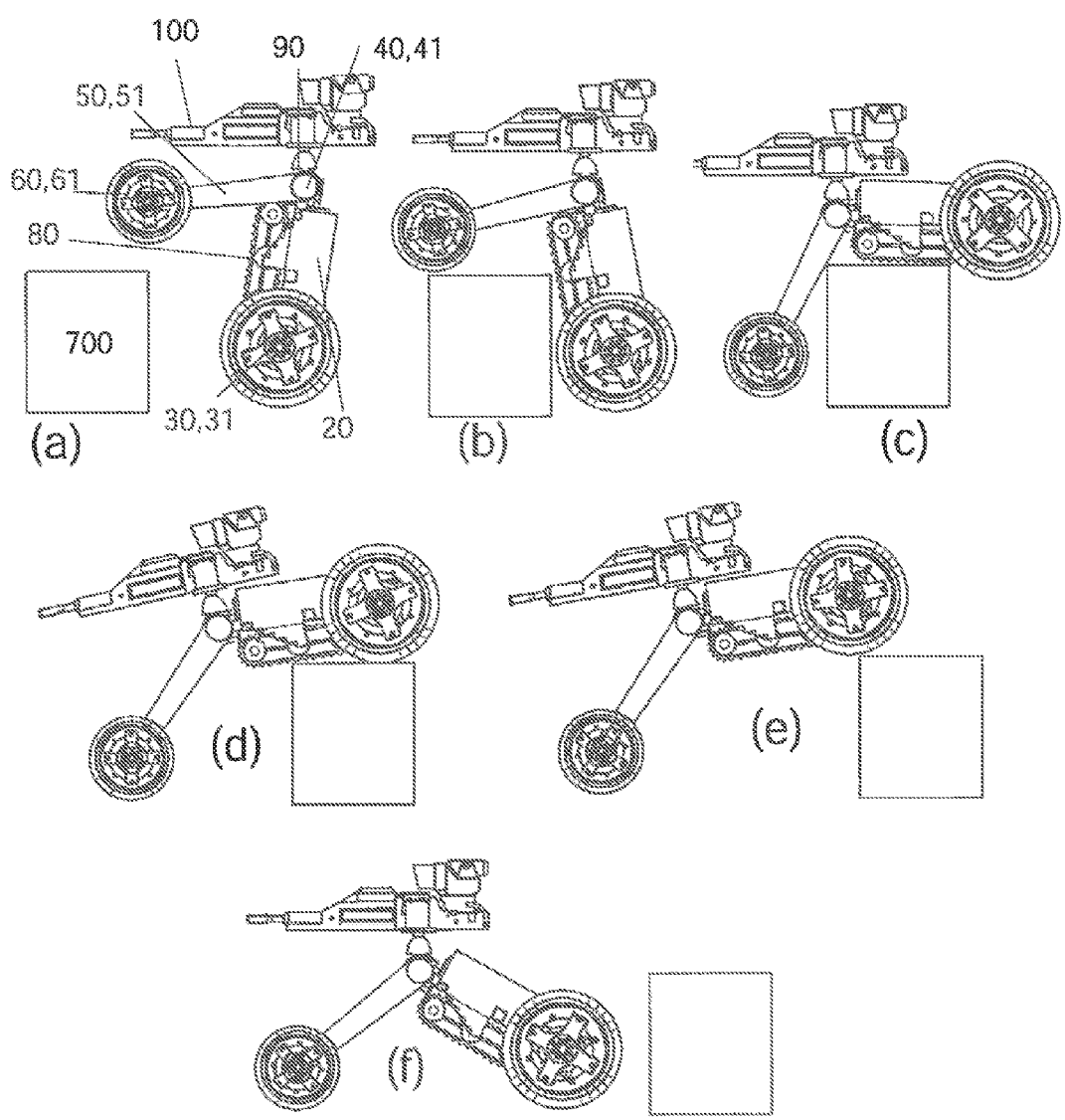
FIG. 13 shows a time-lapsed image sequence of the embodiment of FIG. 4 driving over a relatively large obstacle.

FIG. 13 Shows a time-lapsed image sequence of the embodiment of the invention shown in FIG. 4 riding over a relatively large obstacle. In this image sequence, the robot lifts its arm links 50, 51 and arm wheels 60, 61 while approaching obstacle 700 while balancing (a); lowers its arm wheels 60, 61 onto the obstacle and lowers its base 20 such that track system 80 on base 20 makes contact with obstacle 700 (b); uses track system 80 to pull itself up and onto obstacle 700 (c); makes contact between main drive wheels 30, 31 and the top of obstacle 700 and uses a combination of track system 80 and main drive wheels 30, 31 to drive over obstacle 700, while arm wheels 60, 61 regain contact with the ground (d); finishes driving over obstacle 700 using main drive wheels 30, 31 (e); loses contact between main drive wheels 30, 31 and obstacle 700 and regains contact between main drive wheels 30, 31 and the ground (f). During this maneuver, turret 90 can be operated to orient weapon system 100 to a desired orientation with respect to the ground, independent of the configuration of the robot. Track system 80 may be remotely actuated by an operator or it may be automatically actuated when the robot detects that its forward progress is impeded by the obstacle.

Figure 14:
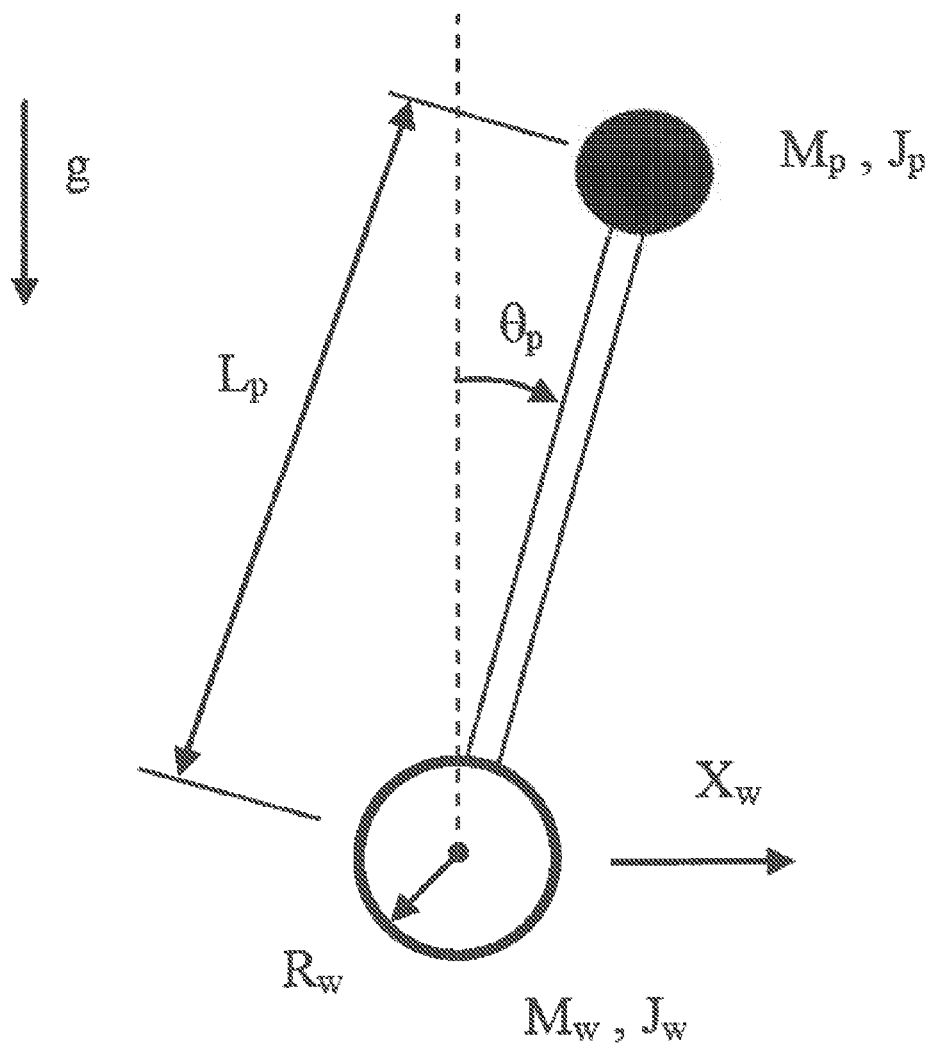
FIG. 14 shows a model on an inverted pendulum on a wheel. This model is useful for analyzing and designing the balance controller for the robot

FIG. 14 shows a mathematical model of an inverted pendulum on a wheel. This model is useful for analyzing and designing the balance controller for the balance configuration, as described subsequently.

Figure 15:
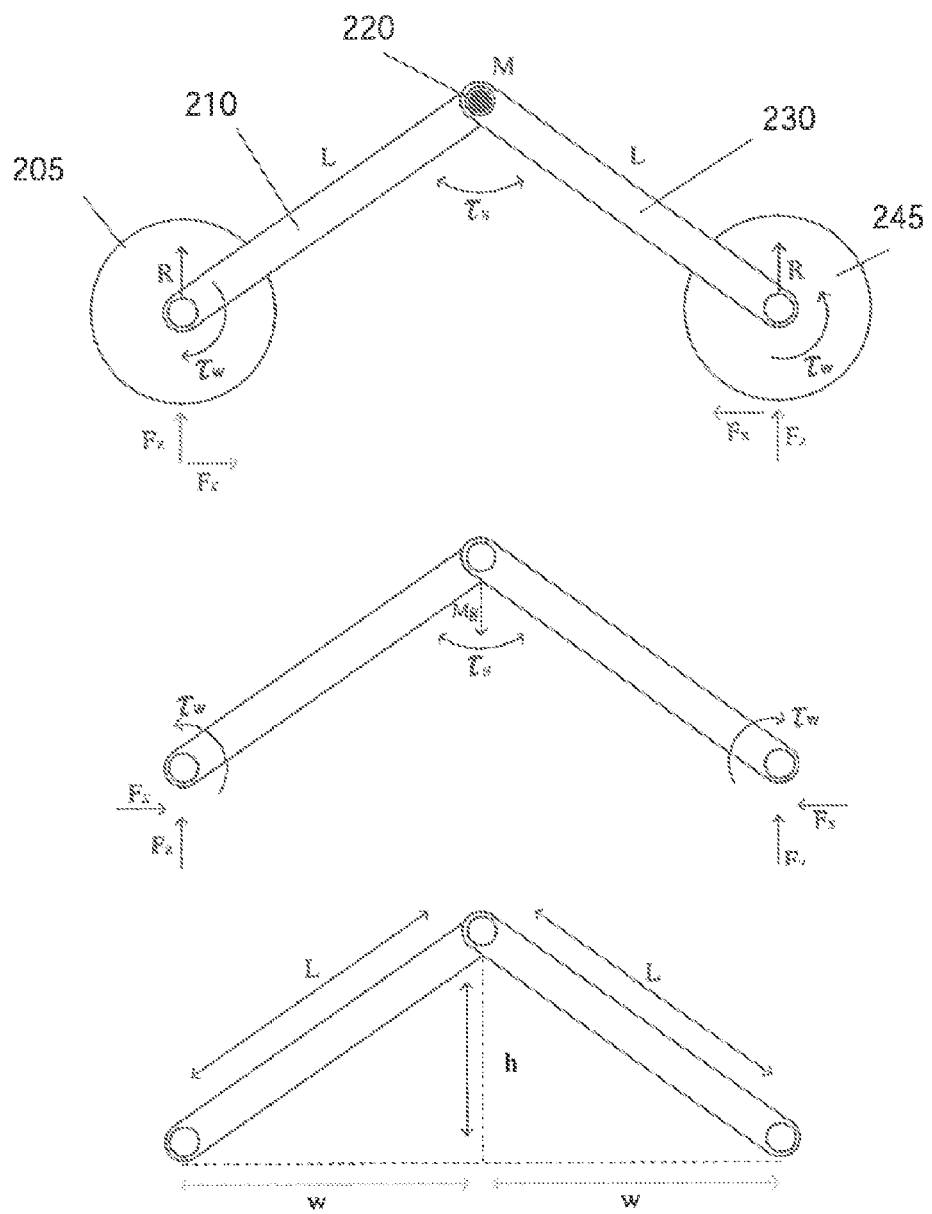
FIG. 15 shows a model of one embodiment of the invention useful for computing the wheel and shoulder joint torques in order to transition from a low Center of Mass configuration to an A-frame configuration.

FIG. 15 shows a mathematical model of one embodiment of the invention useful for computing the wheel and shoulder joint torques in order to transition from a low Center of Mass configuration to an A-frame configuration, Rear drive wheel 205 is connected to rear base 210. Rear base 210 is connected to powered joint 220. Front base 230 is also connected to powered joint 220. Front drive wheel 245 is connected to front base 230. In this model, the following assumptions are made: (1) the Center of Mass of the device lies at the location of powered joint 220; (2) the entire device has a mass of M; (3) front base 230 and rear base 210 are both of the same length, L; (4) wheels 205, 245 are both of the same radius, R; (5) the torque applied to the powered joint 220 is $\tau_S$; (6) the torque applied to each wheel 205, 245 is $\tau_W$; and (7) the center of mass is at a vertical height, h, above the center of the wheels, and at a horizontal distance, w, from the center of the wheels.

Shown in FIG. 15 are various symbols representing the forces and torques on the system. $F_X$ is the horizontal force between the pound and each wheel, and also between each wheel and its associated base. $F_Z$ is the vertical force between the ground and each wheel, and also between each wheel and its associated base. Mg is the force produced by gravitation on the mass. With this model, the relation between the quantities required to support the mass is $$\tau_S + \frac{(h+R)}{R}\tau_W = \frac{1}{2}Mgw$$

The derivation of this equation is explained subsequently. This relation can be used to compute the torque at wheels 205, 24 and powered joint 220 needed to support the mass. If larger torques are applied, then the mass will accelerate upward, raising the Center of Mass. If smaller torques are applied, then the mass will accelerate downward, lowering the Center of Mass.

Balancing in the High Center of Mass Configuration

The reconfigurable robot balances when in the high Center of Mass configuration. Control action required to balance this configuration is generally accomplished by: (1) computing the dynamic equations of motion for the robot; (2) linearizing the dynamic equations; (3) determining a parameterized feedback control system; and (4) determining suitable and/or optimal control system parameters using one of a number of different mathematical control system tools.

As a first approximation to the full dynamics of the reconfigurable robot, we can compute the equations of motion of a simplified system consisting of an inverted pendulum on a single wheel, as shown in FIG. 14 This system is a simplification of a balancing robot, taking into account only planar motion and locked aims. The equations of motion can be determined using either a free-body diagram approach or a Lagrangian approach. Both approaches result in the following equations of motion:

$$\begin{bmatrix} M_W + M_P + \frac{J_W}{R_W} & M_P L_P \cos\theta_P \\ M_P L_P \cos\theta_P & J_P + M_P L_P^2 \end{bmatrix}$$

$$\begin{bmatrix} \ddot{X}_W \\ \ddot{\theta}_P \end{bmatrix} + \begin{bmatrix} -M_P L_P \sin\theta_P \dot{\theta}_P^2 \\ 0 \end{bmatrix} + \begin{bmatrix} 0 \\ -M_P L_P g \sin\theta_P \end{bmatrix} = \begin{bmatrix} \frac{1}{R_W} \\ -1 \end{bmatrix}\tau$$

where $X_W$ is the forward position of the center of the wheels and $\theta_P$ is the angle of the platform with respect to vertical, $M_P$ is the mass of the upper body platform and arms, $L_P$ is the distance from the wheel pivot to the Center of Mass of the platform, $J_P$ is the moment of inertia of the pendulum about its Center of Mass, $M_W$ is the total mass of the main drive wheels, $J_W$ the moment of inertia of the main drive wheels about their Center of Mass, $R_W$ is the radius of a main drive wheel, $\tau$ is the torque applied, and g is the gravitational acceleration constant. The various length, mass, and inertia properties can be estimated from CAD models, measured through various experimental techniques, or estimated online during operation of the robot using standard adaptive control techniques.

The equations of motion can be linearized about the upright balancing configuration and solved in terms of the state variables:

$$\begin{bmatrix} \ddot{X}_W \\ \ddot{\theta}_P \end{bmatrix} + \begin{bmatrix} 0 & M_{12} \\ 0 & M_{22} \end{bmatrix} \begin{bmatrix} X_W \\ \theta_P \end{bmatrix} + \begin{bmatrix} B_1 \\ B_2 \end{bmatrix} \tau$$

The four condensed parameters of these equations of motion are:

$$M_{12} = \frac{-M_P^2 L_P^2 g}{den};$$

$$M_{22} = \frac{M_P L_P g \left( M_W + M_P + \frac{J_W}{R_W^2} \right)}{den};$$

$$B_1 = \frac{M_P L_P + \frac{J_P}{R_W} + \frac{M_P L_P^2}{R_W}}{den}; \text{ and}$$

$$B_2 = \frac{M_W + M_P + \frac{J_W}{R_W^2} + \frac{M_P L_P^2}{R_W}}{den},$$

where $den = (M_W + M_P) J_P + M_W M_P L_P^2 + J_W / R_W^2 (J_P M_P L_P^2)$.

A simple linear control law that can balance the system is $$\tau = K_1(X_{W_{des}} - X_W) + K_2(\dot{X}_{W_{des}} - \dot{X}_W) + K_3(\theta_{P_{des}} - \theta_P) + K_4(\dot{\theta}_{P_{des}} - \dot{\theta}_P)$$

Using this control law and rewriting the resultant linearized equations of motion in the form $\dot{X} = AX + Bu$, where X is the state variables and u are the inputs, we get $$\frac{d}{dt} \begin{bmatrix} X_W \\ \dot{X}_W \\ \theta_P \\ \dot{\theta}_P \end{bmatrix} = \begin{bmatrix} 0 & 1 & 0 & 0 \\ -B_1 K_1 & -B_1 K_2 & M_{12} - B_1 K_3 & -B_1 K_4 \\ 0 & 0 & 0 & 1 \\ -B_2 K_1 & -B_2 K_2 & M_{22} - B_2 K_3 & -B_2 K_4 \end{bmatrix} \begin{bmatrix} X_W \\ \dot{X}_W \\ \theta_P \\ \dot{\theta}_P \end{bmatrix} + \begin{bmatrix} 0 & 0 & 0 & 0 \\ B_1 K_1 & B_1 K_2 & B_1 K_3 & B_1 K_4 \\ 0 & 0 & 0 & 0 \\ B_2 K_1 & B_2 K_2 & B_2 K_3 & B_2 K_4 \end{bmatrix} \begin{bmatrix} X_{W_{des}} \\ \dot{X}_{W_{des}} \\ \theta_{P_{des}} \\ \dot{\theta}_{P_{des}} \end{bmatrix}$$

The eigenvalues of the A matrix will determine the stability and the response time of the system and will depend on the feedback parameters, $K_1$ through $K_4$. These parameters can be chosen in many ways, including pole placement, LQR techniques, and simply trial and error.

This technique gives a combined applied torque of $\tau$. This torque can be applied to typical embodiments of the invention by dividing it among the main drive mechanisms. For example, in the embodiment of FIG. 1, half the torque can be applied to main drive wheel 30, and half the torque can be applied to main drive wheel 31.

Turning in the High Center of Mass Configuration

In a typical embodiment of the invention, such as the embodiment shown in FIGS. 1 and 2, the robot can turn about a vertical axis by differentially driving main drive wheels 30, 31. The following control law can be used to determine the differential torque to apply to the wheels, $$\tau_Y = K_5(\theta_{Y_{des}} - \theta_Y) + K_6(\dot{\theta}_{Y_{des}} - \dot{\theta}_Y)$$

where $\tau_Y$ is the differential torque to apply to the main drive wheels 30, 31; $\theta_{Y_{des}}$ is the desired yaw angle (rotation about the vertical axis); $\theta_Y$ is the measured yaw angle; $\dot{\theta}_{Y_{des}}$ the desired yaw velocity; $\dot{\theta}_Y$ is the measured yaw velocity; and $K_5$ and $K_6$ are control gains. The desired yaw and yaw velocity may come from a user input interface or from a higher-level controller. The measured yaw and yaw velocity may come from a gyroscope, inertial measurement unit, vision system, or other sensing means. The control gains, $K_5$ and $K_6$ can be chosen using a variety of methods known to those familiar with control system design.

This technique gives a differential applied torque of $\tau_Y$. This torque can be applied to typical embodiments of the invention by distributing it among the main drive mechanisms. For example, in the embodiment of FIG. 1, half the torque can be applied to main drive wheel 30, and an equal and opposite torque can be applied to main drive wheel 31. This will provide a differential torque that results in the control of yaw and yaw velocity. The reader will note that both the control of balance and the control of turning can be achieved simultaneously by applying the above techniques simultaneously through the summation of the resultant torques at each wheel.

Transitioning Between Modes

Various embodiments of the invention transition between several geometric configurations and their associated modes of operation, including a two-wheeled balancing configuration, a four-wheeled low Center of Mass configuration, and a four-wheeled A-frame configuration. Switching between the configurations can be initiated by a human operator When the robot is being teleoperated or automatically during autonomous or semi-autonomous operation.

When in the four-wheeled low Center of Mass configuration, the robot has a low profile and operates much like a remote-controlled car, or conventional four-wheeled robot. Steering and Velocity commands can be directly interpreted into wheel velocity commands.

To transition from the four wheel low Center of Mass configuration to the four-wheeled A-frame configuration, the front wheels can be commanded to drive backwards and the rear wheels can be commanded to drive forward, while the shoulder motors are commanded to be driven to make the robot form an A shape. Once in the A-frame configuration, if desirable, brakes on the shoulder motors can be applied to lock the shoulders, reducing the power consumption at those joints. FIG. 15 shows a schematic of a specific embodiment of the invention that can be used to compute the wheel and shoulder motor torques that can be applied to transition from a low Center of Mass configuration to an A-frame configuration. Performing force balance on the wheel, we have $$F_x = \tau_W / R$$

Performing a force balance in the vertical axis, we have $$F_z = Mg/2$$

Performing a torque balance about the mass, we have $$2F_z w - 2F_x h - 2\tau_W = 2\tau_S$$

Solving the above equations to eliminate $F_x$ and $F_z$ we get, $$\tau_S + \frac{(h+R)}{R}\tau_W = \frac{1}{2}Mgw$$

We see that the Center of Mass can be lifted through multiple combinations of shoulder torque or wheel torques. For example, if only shoulder torque is provided, we get $$\tau_S = \frac{1}{2}Mgw$$

whereas if only wheel torque is provided, we get $$\tau_W = \frac{R}{2(h+R)}Mgw$$

The reader will note that the front and rear wheels do not both necessarily need to be motorized in order to provide a wheel torque $\tau_W$. For example, the front wheels could have a brake instead of a motor and be locked in place. $\tau_W$ could then be applied to just the rear wheel, producing nearly the same effect as had the wheel torque been applied to both wheels. The only difference would be that instead of the Center of Mass transitioning straight vertically, the front wheel would stay in its position on the ground and the Center of Mass would transition both horizontally and vertically. The above equations are for the model in which the Center of Mass lies directly at the powered joint, the front and rear base lengths are the same, the wheel diameters are the same, and the wheel torques are the same. This model was chosen for simplicity of demonstration to demonstrate one specific embodiment of the invention. One skilled. In the art should be able to easily compute related equations for other embodiments of the invention.

Dynamic Transition to the Balancing Configuration

Figure 16:
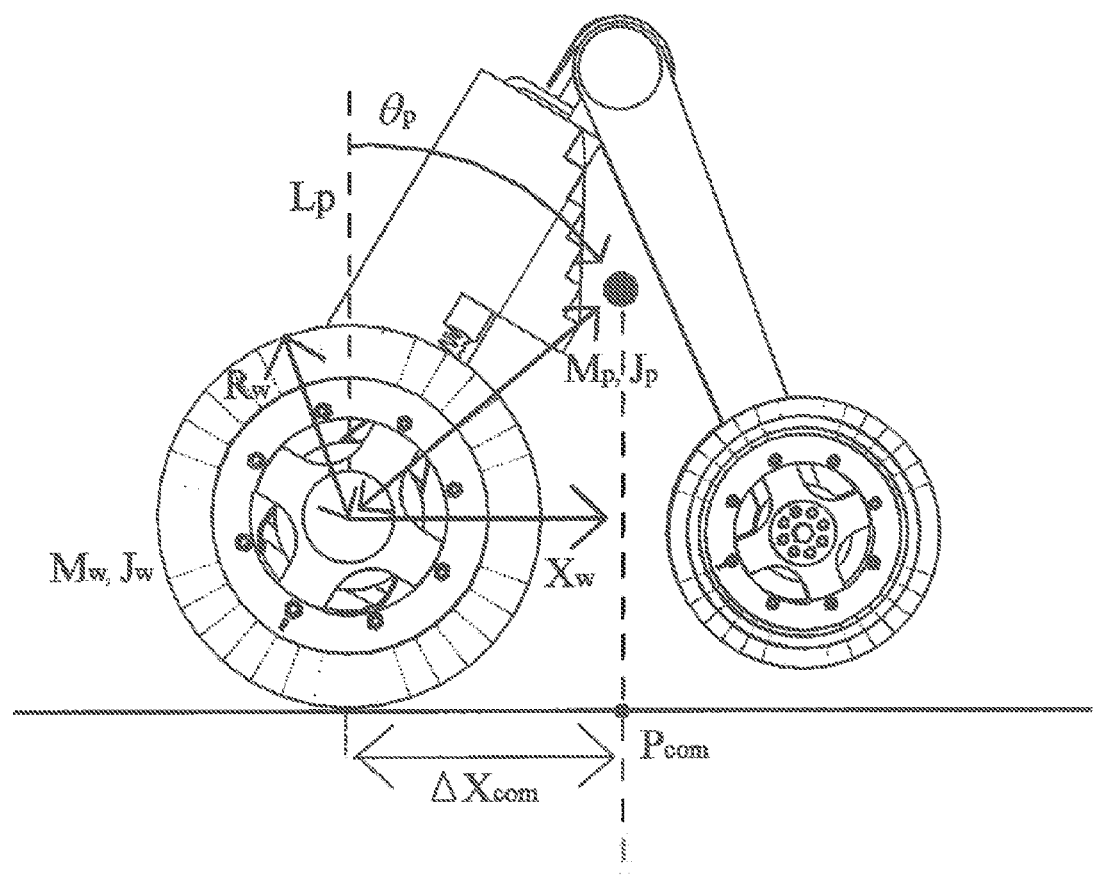
FIG. 16 shows a model of one embodiment of the invention useful for computing a sequence of actions for dynamically transitioning from an A-frame configuration to a high Center of Mass balance configuration.

A robot dynamically transitioning to the balancing configuration is illustrated in FIG. 16. During transition from the low Center of Mass configuration to the high Center of Mass configuration, the robot passes through a sequence of configurations in which the projection of the Center of Mass of the robot onto the ground (the Ground Projection of the Center of Mass) lies outside the Ground Support Polygon of the robot. The Center of Mass is the weighted average location of all of the mass of the robot. The Ground Projection of the Center of Mass, $P_{com}$, is the point on the ground directly below the Center of Mass location. The Ground Support Polygon is defined by the convex hull of all the points of contact between the robot and the ground. Both "Ground Projection of the Center of Mass" and "Ground Support Polygon" are toms commonly used in dynamically balanced robotic fields, for example the field of legged robots. "Convex hull" is a term commonly used in mathematics. The convex hull of a set of points, X, is the minimal convex set containing X. If all ground contacting points lie in the same plane, the convex hull may be visualized by imagining an elastic band stretched to encompass gall of the ground contacting points. If a perpendicular stake (perpendicular relative to the plane) is placed at the location of each ground contacting point, the elastic band will take on the shape of the convex hull when the elastic baud is released, A robot with Static Mobility is one in which the Ground Projection of the Center of Mass always lies within the Ground Support Polygon. One example would be a slow walking hexapedal robot with an alternating tripod gait. A robot with Dynamic Mobility is one in which, the Ground Projection of the Center of Mass occasionally lies outside the Ground Support Polygon. One example would be a fast walking or running biped. A robot with Static Mobility can move at slow speeds without consideration for the dynamics of the robot, but only with consideration for the geometric kinematics of the robot. A robot with Dynamic Mobility must move in such a way that takes dynamics into consideration. For example, a bipedal walking robot cannot come to a stop at an arbitrary point in its gait. When the (hound Projection of the Center of Mass lies outside the Ground Support Polygon, the robot must continue moving and take a step or it will fall down.

The main advantage of Static Mobility is that when the Ground Projection of the Center of Mass is inside the Ground Support Polygon, the robot is typically very stable and resistant to disturbances or tipping. A main advantage of Dynamic Mobility is high maneuverability since it is not a requirement that the Ground Projection of the Center of Mass stays inside the Ground Support Polygon. The present invention can transition between Static Mobility configurations and Dynamic Stability configurations. Depending on the situation, a configuration can be chosen based on the importance of the advantages of that configuration.

Many embodiments of the present invention exhibit Dynamic Mobility when dynamically transitioning from a low Center of Mass configuration to a high Center of Mass configuration. In the following discussion, the embodiments of FIG. 4 and FIG. 9 are considered, although the discussion pertains to any embodiment of the present invention that exhibits dynamic mobility.

To dynamically transition from the low Center of Mass configuration to the high Center of Mass two-wheeled balancing configuration, the robot provides a rotational torque with rear drive wheels 30, 31. There are a number of ways to provide this torque. In one way, the robot starts from a stationary position and applies a large torque to the rear wheels, thereby lifting the front wheels, much like a motorcycle "popping a wheelie". However, using this technique requires a large forward displacement of the robot as the wheel torque that lifts the body of the robot also produces a large forward acceleration of the robot. The amount of forward displacement required is in relation to the amount of rear drive wheel torque that is applied. The larger the rear drive wheel torque, the less displacement required. Thus it is preferable to apply the maximum available torque. However, drive components such as electric motors have maximum torque limits and with typical components available today, a significant forward displacement occurs using this method.

A preferred method is to first apply a reversing torque to the rear drive wheels when in the A-frame configuration (FIG. 9$e$,$f$), thereby causing a backward velocity of the robot. Then, after a period of time has passed or the robot has achieved a predefined threshold backward velocity, a large forward torque is applied to the rear wheels. This forward torque both stops the backward translational velocity of the robot and also lifts the body of the robot (FIG. 9($g$), ($h$), ($i$)). After a predefined period of time, or after a threshold pitch is reached, the balancing control system is then switched on and the robot balances (FIG. 9($j$), ($k$), ($l$)). A flowchart illustrating an implementation of this method is provided in FIG. 7 (and described previously).

This method of first providing a backward velocity before applying a forward rear drive wheel torque is preferred because a minimal amount of body displacement is produced as a result of the transition. Both in simulation studies and prototype experimentation, it has been determined that a robot can perform this dynamic transition in less than one meter of total travel. Determining the amount of torque to apply and the conditions for transitioning from reverse torque to forward torque can be achieved in a number of ways, including manual tuning of parameters, automatic tuning through adaptive control and learning control techniques, and automatic tuning through parameter search methods such as gradient descent and genetic algorithms.

The reader should note that this method can work whether the robot starts in a low Center of Mass configuration (FIG. 9a) or an intermediate Center of Mass A-Frame Configuration (FIG. 9d). However, starting in the A-Frame configuration is preferable, as the amount of rear drive wheel torque required to perform the maneuver is reduced, and the amount of travel required to perform the maneuver is reduced.

The reader will note that in FIG. 16, the Ground Projection of the Center of Mass falls a substantial distance, $\Delta X$, away from the support points of the wheels. When $\Delta X$ is large, as in FIG. 16, the robot dynamically transitions to the balance configuration. In order to do so, a corresponding large torque will be applied to the main wheels. Less torque is required when $\Delta X$ is small. As mentioned previously, the method of backing up and then accelerating forward may also be used to reduce the forward distance of travel required to transition to the balancing configuration.

Leveling the Turret During Transitions

It is a further object of the present invention to provide a method for rotating a gun carriage into a level position during the transitions to the several operating positions previously described. The amount of pitch movement is not always available within the mounted gun turret assembly, so an additional mechanism known as a gun mount carriage assembly is incorporated.

Figure 17:
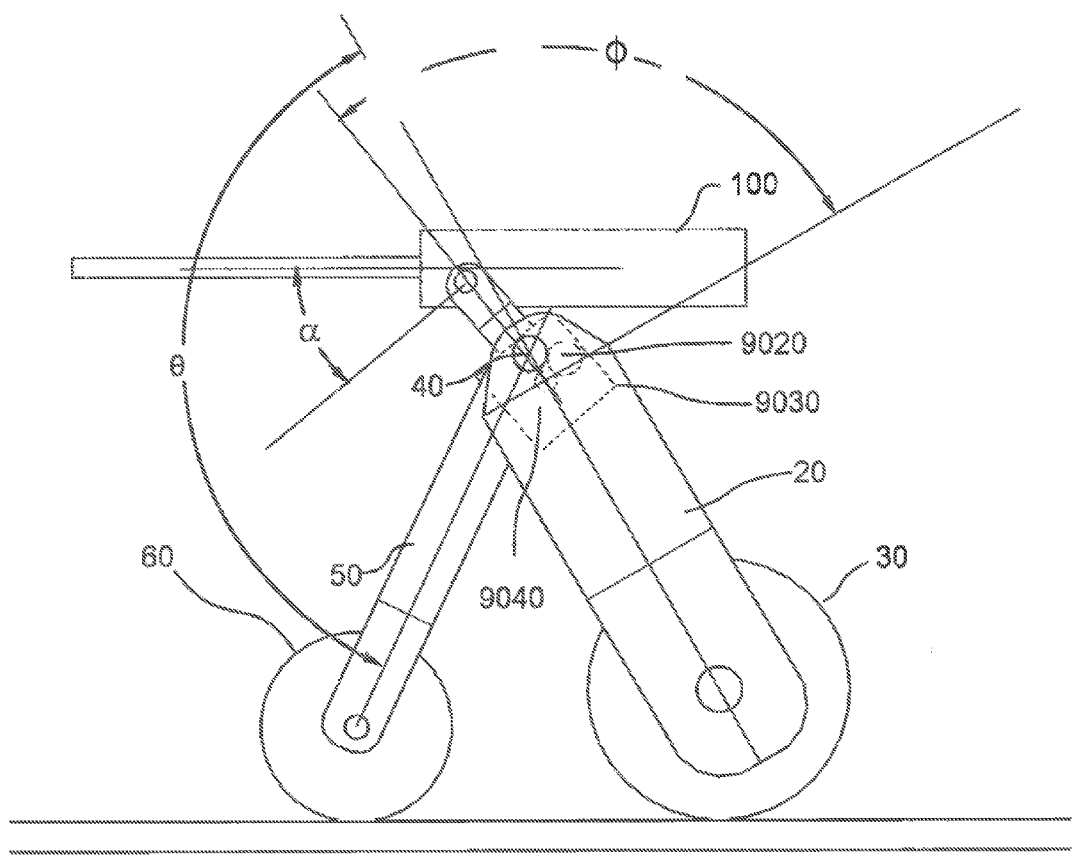
FIG. 17 shows a model of one embodiment of the invention with a gun turret carriage useful for computing a sequence of actions for controlling the pitch of the gun mount while transitioning from a Low Center of Mass configuration to a high Center of Mass configuration.

As illustrated in FIG. 17, the rate R ($\dot{\alpha}$) that gun mount carriage 9030 needs to rotate to keep the gun mount carriage level when the robot is balanced is about 0.8 times the rate of rotation of arm 50. This is derived from the fact that the arms will rotate through an angle of $\theta$ to the A-frame position while the gun mount carriage needs to move only $\theta/2$ deg. The mount needs an additional $\alpha$ deg of forward rotation to be level when the balanced position is attained and the total rotation of the carriage is $\phi=\theta/2+\alpha$. This determines the gear reduction or rate to be R=$\phi/\theta$ or $0.5+\alpha/\theta$. A solenoid-activated gear 9020 with this ratio is attached between gears on arm motor shafts 40 and corresponding gears 9040 on the gun mount carriage. The carriage rotation is capable of being locked at the three cardinal positions (cart, A-frame and balanced) using beveled solenoid operated pins. With this configuration the gun mount carriage will rotate slightly ahead of the angular position of the arms at a rate of R times the moving angle of the turn. However, during the movement to A-frame this rate needs to be only half of the arm rate to keep the gun level so the extra rate, $\alpha/\theta$, is automatically removed by the gun leveling feature of the turret. When the robot reaches the A-frame position the gun carriage is locked, the arms gear disengaged, and $\alpha$-degrees of turret elevation have been consumed. As the robot is configured farther into the balancing posture, the gun turret-leveling feature keeps the gun level, removing the extra $\alpha$-degrees of pitch from the turret elevation. Once balanced the available pitch range of the gun will he the full elevation range of the turret.

Figure 18:
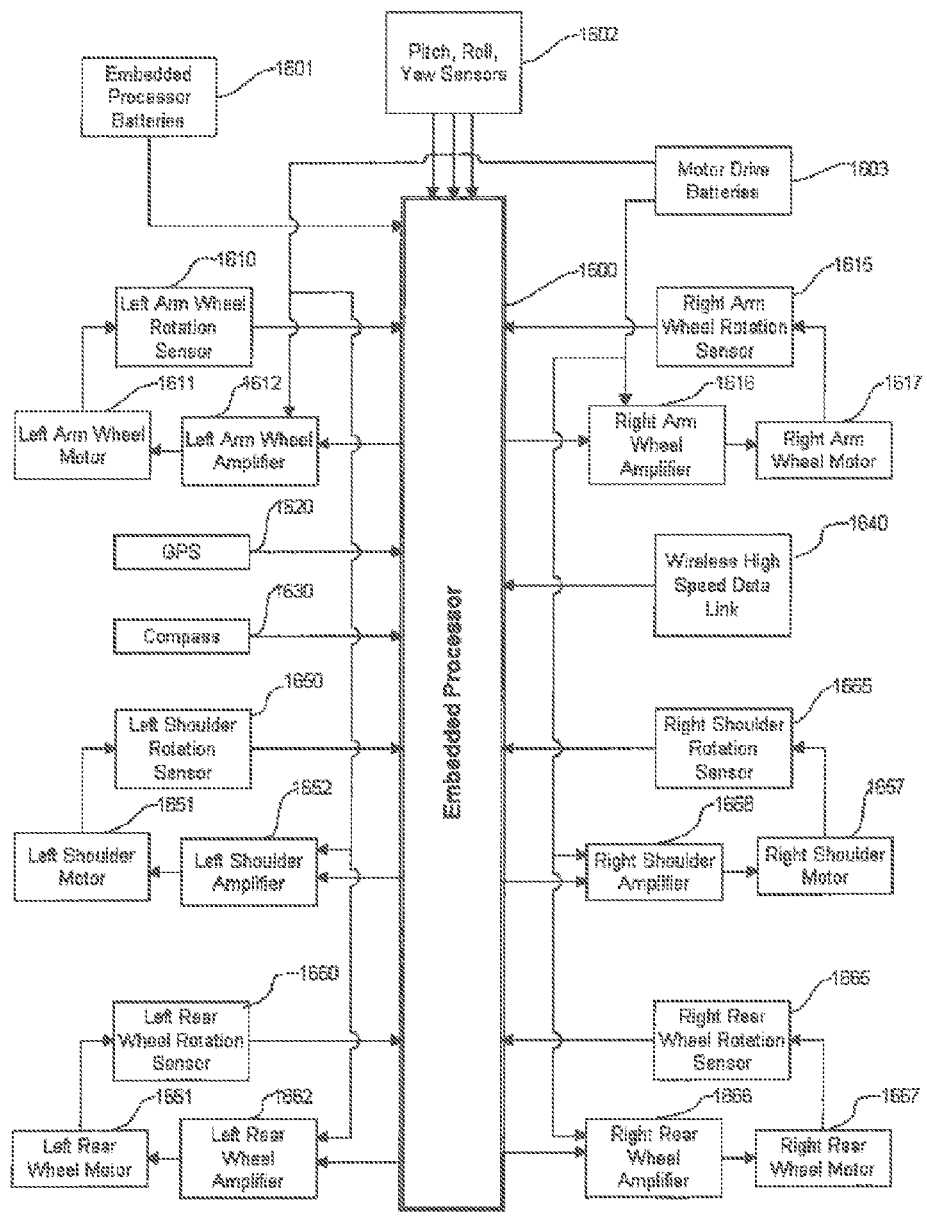
FIG. 18 shows a control system diagram.

A control system for the control of the robot is illustrated in FIG. 18. Embedded processor 1600 receives input signals from wireless high speed data link 1640. Wireless high speed data link 1640 provides directional control over the operation of the robot. In particular, wireless data link 1640 directs the robot to move forward and backward, to turn left and right, to switch between low center of mass and high center of mass operating modes, and to control the weapons or camera systems. Embedded processor 1600 also receives inputs from various sensors including pitch, roll, and yaw sensors 1602 which provide orientation feedback to embedded processor 1600. This orientation feedback is particularly useful in holding the robot in the balancing configuration as discussed previously. Embedded processor 1600 also receives input from GPS device 1620 and compass 1630. Embedded processor batteries 1601 provides power for controlling the various operations carried out by embedded processor 1600.

Embedded processor 1600 directs torque to left rear wheel motor 1661 and right rear wheel motor 1667 through left rear wheel amplifier 1662 and right rear wheel amplifier 1666, respectively. Embedded processor 1600 receives data regarding the rate of rotation of the left rear wheel and the right rear wheel via left rear wheel rotation sensor 1660 and right rear wheel rotation sensor 1665, respectively.

Embedded processor 1600 directs torque to left shoulder motor 1651 and right shoulder motor 1657 through left shoulder amplifier 1652 and right shoulder amplifier 1656, respectively. Embedded processor 1600 receives data regarding the rate of rotation of the left shoulder and right shoulder via left shoulder rotation sensor 1650 and right shoulder rotation sensor 1655, respectively.

Embedded processor 1600 directs torque to left arm wheel motor 1611 and right arm wheel motor 1617 through left arm wheel amplifier 1612 and right arm wheel amplifier 1616, respectively. Embedded processor 1600 receives data regarding the rate of rotation of the left arm wheel and the right arm wheel via left arm wheel rotation sensor 1610 and right arm wheel rotation sensor 1615, respectively. Power is supplied to the aforementioned amplifiers through motor drive batteries 1603.

Figure 19:
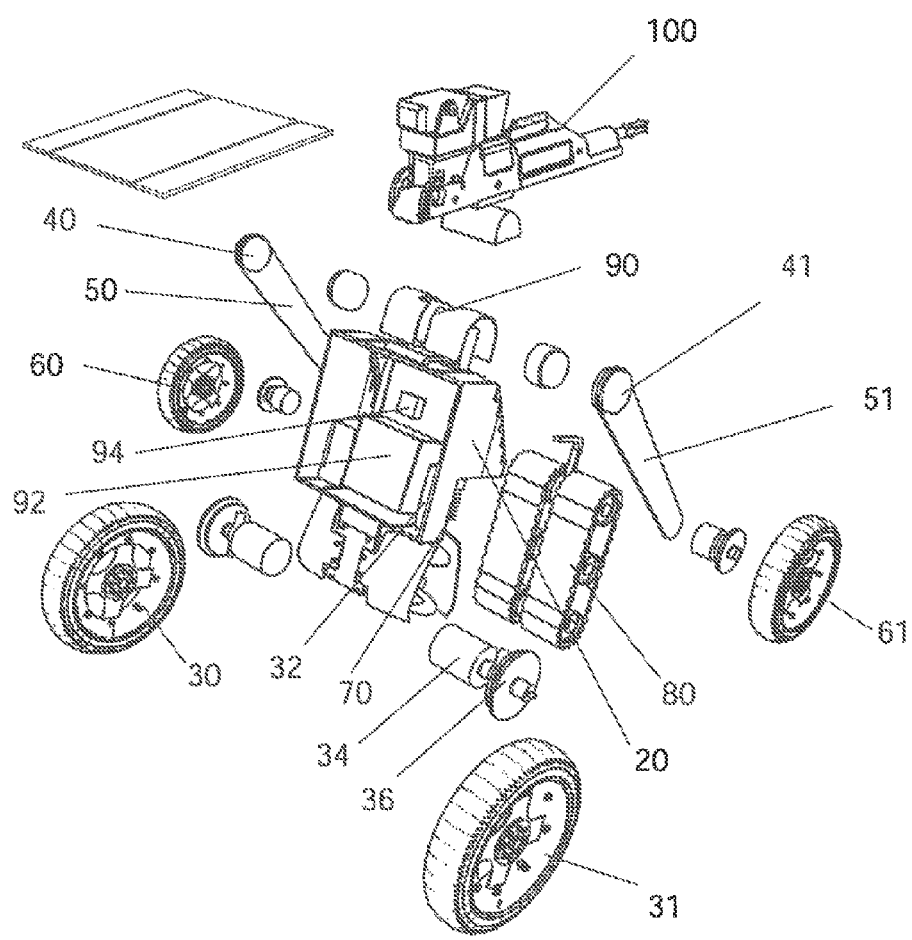
FIG. 19 shows an exploded view of the embodiment of FIG. 4.

An exploded view of the present invention is provided in FIG. 19. Inertial measurement unit 94 is attached to base 20. Inertial measurement unit 94 includes sensors capable of detecting pitch, roll, and yaw of base 20. Inertial measurement unit 94 may optionally include sensors capable of detecting linear acceleration in the X, Y, and Z directions. Embedded computer system 92 includes the aforementioned embedded processor and related circuitry. Motor amplifier 32 amplifies signals from embedded computer system 92 to drive electric motor 34. Gear reduction 36 is provided, between electric motor 34 and main drive wheel 31 to deliver optimal rotational speed and force.

Ability to Travel in Three Distinct Modes

From the preceding descriptions, the reader will understand that the reconfigurable robot is able to travel in three distinct configurations. These are: (1) A low center of mass four-wheel configuration ("Low 4"), (2) An "A-Frame" four-wheel configuration ("A-Frame 4"), and (3) A high center of mass two-wheel configuration ("High 2"). In all three configurations the robot is able to move by providing torque to the rear wheels. In other words, in all three configurations the robot is able to move as a wheeled vehicle.

Each of the three configurations has advantages. In the Low 4 configuration, the overall center of mass is quite low and the robot travels much like a 4-wheel car. It is able to turn rapidly without tipping. It is also quite resistant to external tipping forces. These will generally cause the vehicle to slide rather than tip over.

The A-Frame 4 configuration allows the robot to raise its payload (such as a camera or weapon) to a much greater height, thereby affording enhanced visibility. The ground space occupied by the four wheels is also reduced in comparison to the Low 4 configuration. The robot may still be maneuvered as a 4-wheeled vehicle, but care must be taken to avoid tipping. External forces are of course more able to tip the robot as well The High 2 configuration provides the greatest payload height. It also provides the greatest maneuverability, since the robot can torn in place by applying differential torque to the rear wheels. However, the robot is more vulnerable to external tipping forces.

As explained previously, the shoulder joints are generally powered when transitioning between the configurations. However, it is also possible to lock the shoulder joints in position—preferably using a mechanical brake or latch in order to minimize power consumption. For example, it is preferable to lock the shoulder joints when the robot is in the Low 4 configuration and the A-Frame 4 configuration. The shoulders may also be locked in the High 2 configuration, though they may also be allowed to move in order to use the arms for balance and to raise the arms to transition over obstacles, etc.

Some definitions may benefit the reader's understanding. First, the robot should he distinguished from the payload it carries. FIG. 3 provides a good illustration of this concept. The robot consists primarily of base 20, rear wheels 31, shoulder joints 41, aims 50, 51, and front wheels 60, 61. The robot may include addition features such as track system 80. The payload in the example of FIG. 3 includes turret 90 and camera system 110. FIG. 4 shows the same robot with a different payload consisting of turret 90 and weapon system 100.

The robot with no additional payload has a center of mass. This is referred to as a "robot center of mass." The rear wheels of the robot (main drive wheels 30, 31) have a rear wheel diameter. When the robot is in the Low 4 configuration, the robot center of mass should be less than 100% of the rear wheel diameter of the ground. In other words, in the Low 4 configuration, the robot center of mass should be below the top of the rear wheel. This configuration is shown, for example, in FIG. 9(A).

When the robot transitions to the A-Frame 4 configuration, the robot center of mass is raised. In this configuration, the robot center of mass is preferably more than 75% of the rear wheel diameter off the pound, but less than 150% of the rear wheel diameter off the ground. FIGS. 9(E) and (F) provide examples of this configuration—though not necessarily examples of the extremes of the defined range.

When the robot transitions to the High 2 configuration, the robot center of mass must of course be higher than 50% of the rear wheel diameter, As a practical matter, the robot center of mass should be greater than 100% of the rear wheel diameter so that the inverted pendulum balancing technique may be used.

In the Low 4 configuration, torque may be applied to the rear wheels and the front wheels to drive the robot along. In the A-Frame 4 configuration, torque may also be applied to all four wheels to drive the vehicle along. In the High 2 configuration, only the rear wheels touch the ground. Thus, only the rear wheels apply driving torque.

The robot is designed to roll move efficiently in all three configurations. This efficiency is obtained through the use of powered wheels. Each configuration has advantages and disadvantages. Each configuration may be the best choice in a particular scenario.

The preceding description contains significant detail regarding the novel aspects of the present invention. It should not be construed, however, as limiting the scope of the invention but rather as providing illustrations of the preferred embodiments of the invention. As an example, the reconfigurable may have more utilize multiple joints to provide greater range of articulation. Such, variations do not alter the function of the invention. Thus, the scope of the invention should be fixed by the following claims, rather than by the examples given.

Having described our invention, we claim:

1. A method for adapting a reconfigurable robot to travel over varying conditions in the pound over which said robot travels, comprising:
  a. providing a reconfigurable robot, said reconfigurable robot including,
    i. a base, having a first end, a second end, and a forward facing side, with a first rear wheel and a second rear wheel being attached to said first end of said base,
    ii. said first and second rear wheel having a rear wheel diameter,
    iii. an arm, having a first end and a second end, with a front wheel being attached to said second end of said arm,
    iv. a rotating shoulder joint connecting said first end of said arm to said second end of said base,
    v. a track system mounted on said forward facing side of side base;
  b. said reconfigurable robot having a robot center of mass;
  c. said reconfigurable robot being configurable into,
    i. a low center of mass four-wheel configuration in which said rear wheels and said front wheel rest on said ground and said robot center of mass is less than 100% of said rear wheel diameter off said ground,
    ii. an A-Frame four-wheel configuration in which said rear wheels and said front wheel rest on said ground and said robot center of mass is more than 75% but less than 150% of said rear wheel diameter off said ground,
    iii. a high center of mass two-wheel configuration in which only said rear wheels rest on said ground and said robot center of mass is greater than 100% of said rear wheel diameter off said ground;
  d. wherein said reconfigurable robot can move forward by applying torque to said rear wheels in said low center of mass four-wheel configuration, said A-Frame four-wheel configuration, and said high center of mass two wheel configuration;
  e. providing said reconfigurable robot in said low center of mass four-wheel configuration;
  f. applying torque to said shoulder joint to raise said reconfigurable robot to said A-Frame four-wheel configuration; and
  g. applying sufficient forward torque to said rear wheels to raise said front wheel off said ground and thereafter transition said reconfigurable robot to said high center of mass two-wheel configuration.

2. The method for adapting a reconfigurable robot as recited in claim 1, wherein:
  a. said shoulder joint is lockable; and
  b. said shoulder joint is locked when said reconfigurable robot is in said low center of mass four-wheel configuration and said A-Frame four-wheel configuration.

3. The method for adapting a reconfigurable robot as recited in claim 2, wherein said shoulder joint is unlocked when said reconfigurable robot is transitioning from one configuration to another.

4. The method for adapting a reconfigurable robot as recited in claim 1, further comprising:
   a. wherein said Shoulder joint is powered;
   b. providing a control system for controlling the amount of torque applied to said front wheel, said rear wheels, and said powered shoulder joint;
   c. providing an angle sensor for sensing the angle between said base and said ground, said angle sensor providing a value for said angle to said control system; and
   d. said control system using said value for said angle to control said applied torques in order to achieve said high center of mass two-wheel configuration.

5. The method for adapting a reconfigurable robot as recited in claim 4, further comprising providing a second angle sensor for sensing the angle between said arm and said base, said second angle sensor providing a value for said angle between said arm and said base to said control system.

6. The method for adapting a reconfigurable robot as recited in claim 4, wherein torques applied to said front wheel, said rear wheels, and said shoulder joint are applied simultaneously.

7. The method for adapting a reconfigurable robot as recited in claim 1, wherein said first rear wheel and said second rear wheel can be driven at different speeds in order to steer said reconfigurable robot.

* * * * *